(12) United States Patent
Yoshii et al.

(10) Patent No.: US 7,971,014 B2
(45) Date of Patent: Jun. 28, 2011

(54) INFORMATION PROCESSING APPARATUS AND DATA RECOVERING METHOD

(75) Inventors: Kenichiro Yoshii, Tokyo (JP); Hiroshi Yao, Kanagawa (JP); Tomohide Jokan, Kanagawa (JP); Tatsunori Kanai, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 450 days.

(21) Appl. No.: 12/198,473

(22) Filed: Aug. 26, 2008

(65) Prior Publication Data
US 2009/0172325 A1    Jul. 2, 2009

(30) Foreign Application Priority Data
Dec. 27, 2007  (JP) .................................. 2007-336854

(51) Int. Cl.
*G06F 12/16* (2006.01)
*G06F 13/00* (2006.01)

(52) U.S. Cl. ................................ 711/162; 711/E12.103

(58) Field of Classification Search .................. 711/162, 711/E12.103
See application file for complete search history.

(56) References Cited

FOREIGN PATENT DOCUMENTS
JP        2005-107573        4/2005

OTHER PUBLICATIONS

Yoshii et al., U.S. Appl. No. 12/199,111, filed Aug. 27, 2008, entitled Information Processing Apparatus and Data Recovering Method.

*Primary Examiner* — Yong Choe
(74) *Attorney, Agent, or Firm* — Finnegan, Henderson, Farabow, Garrett & Dunner, L.L.P.

(57) ABSTRACT

In an information processing apparatus, when an instruction is issued to write back storage contents of a main memory unit that is non-volatile, data and a write destination address included in a backup data that is set with a read permission are extracted from the backup data stored in a backup memory unit that is non-volatile. Further, according to the data and the write destination address extracted from the backup data, the data is written to a storage area of the main-memory unit indicated by the write destination address.

10 Claims, 15 Drawing Sheets

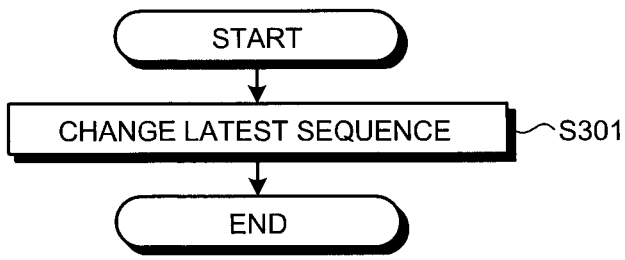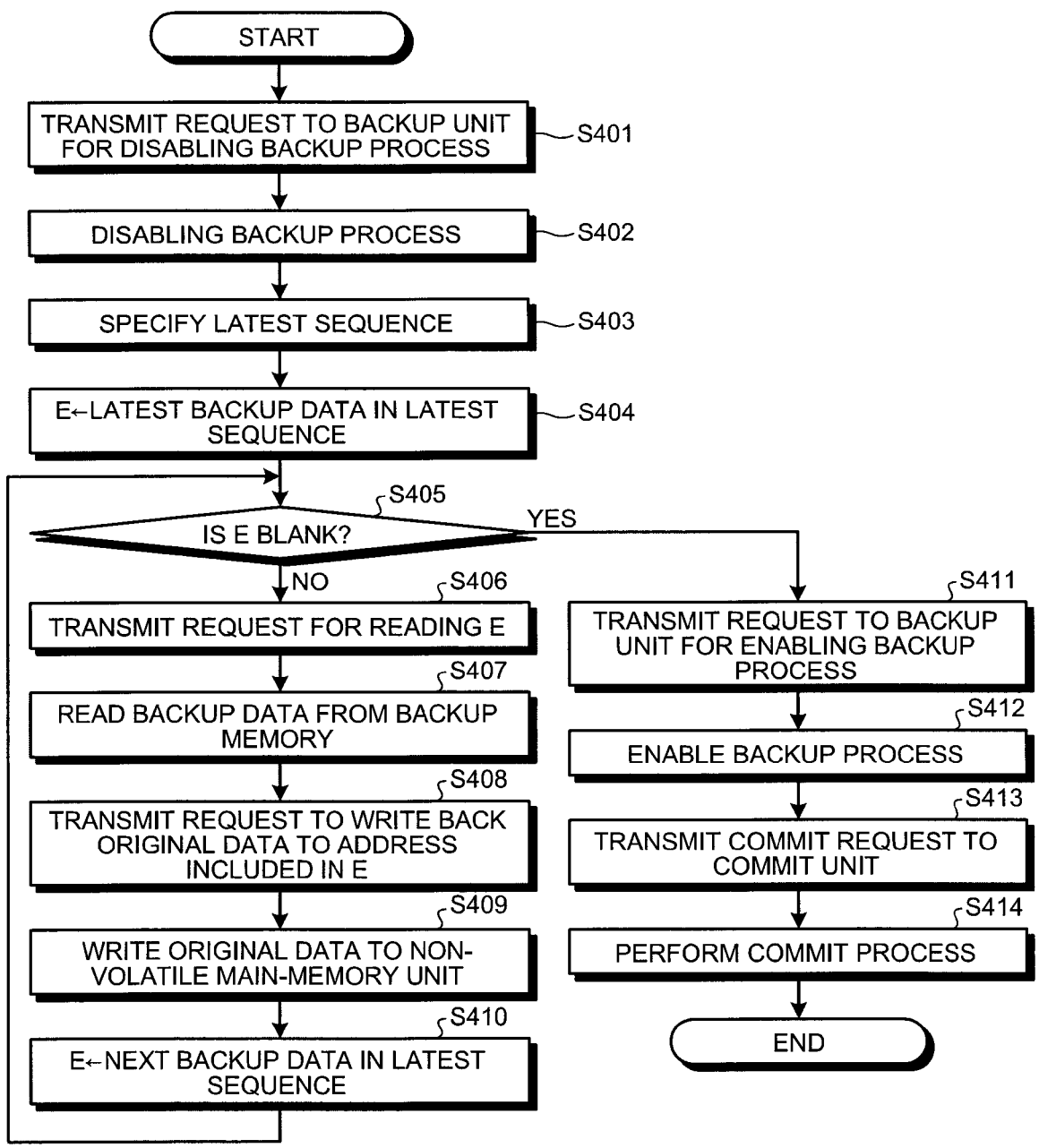

BEFORE WRITING FOR FOURTH TIME

AFTER WRITING FOR FOURTH TIME

AFTER COMMIT PROCESS

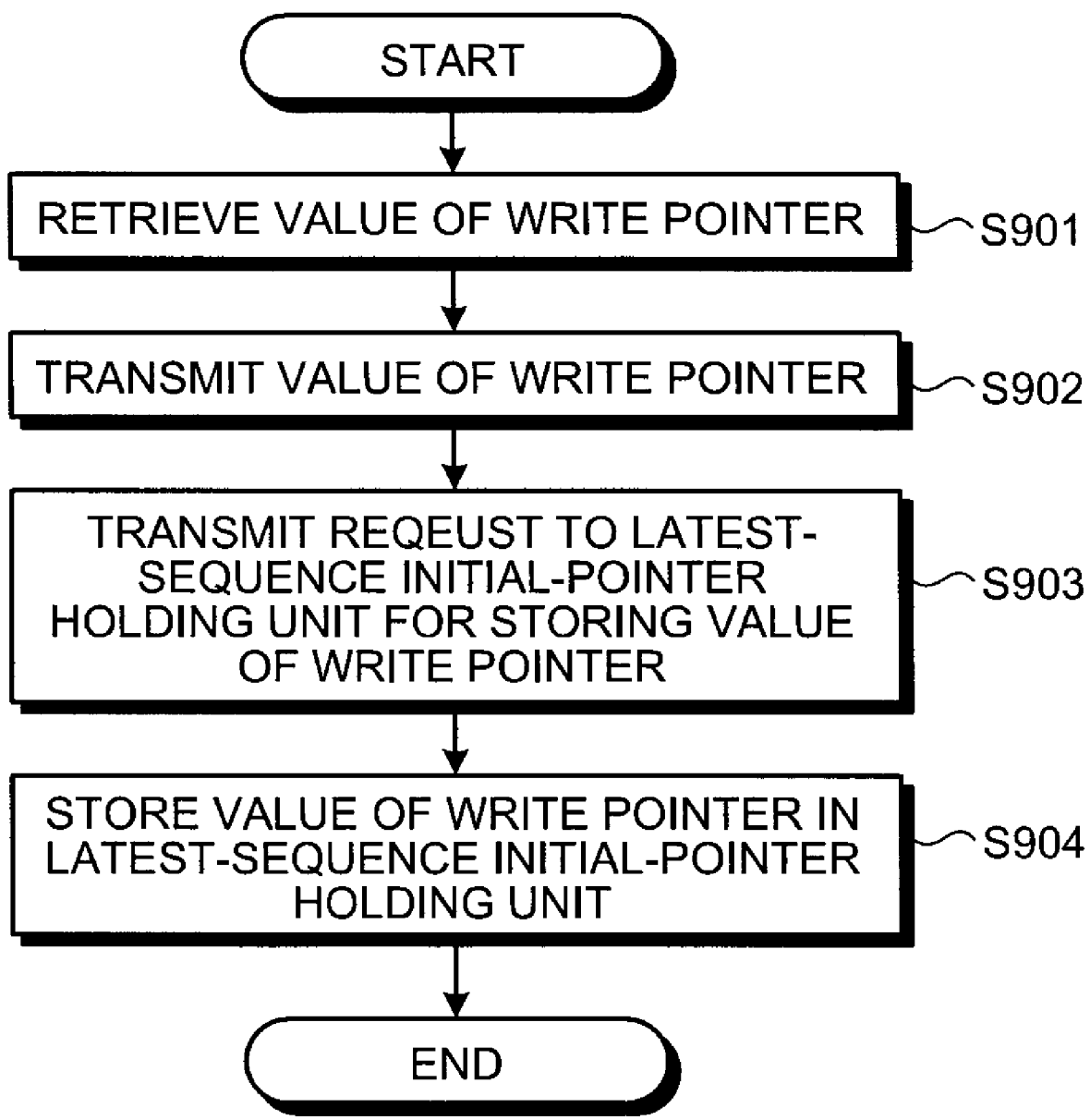

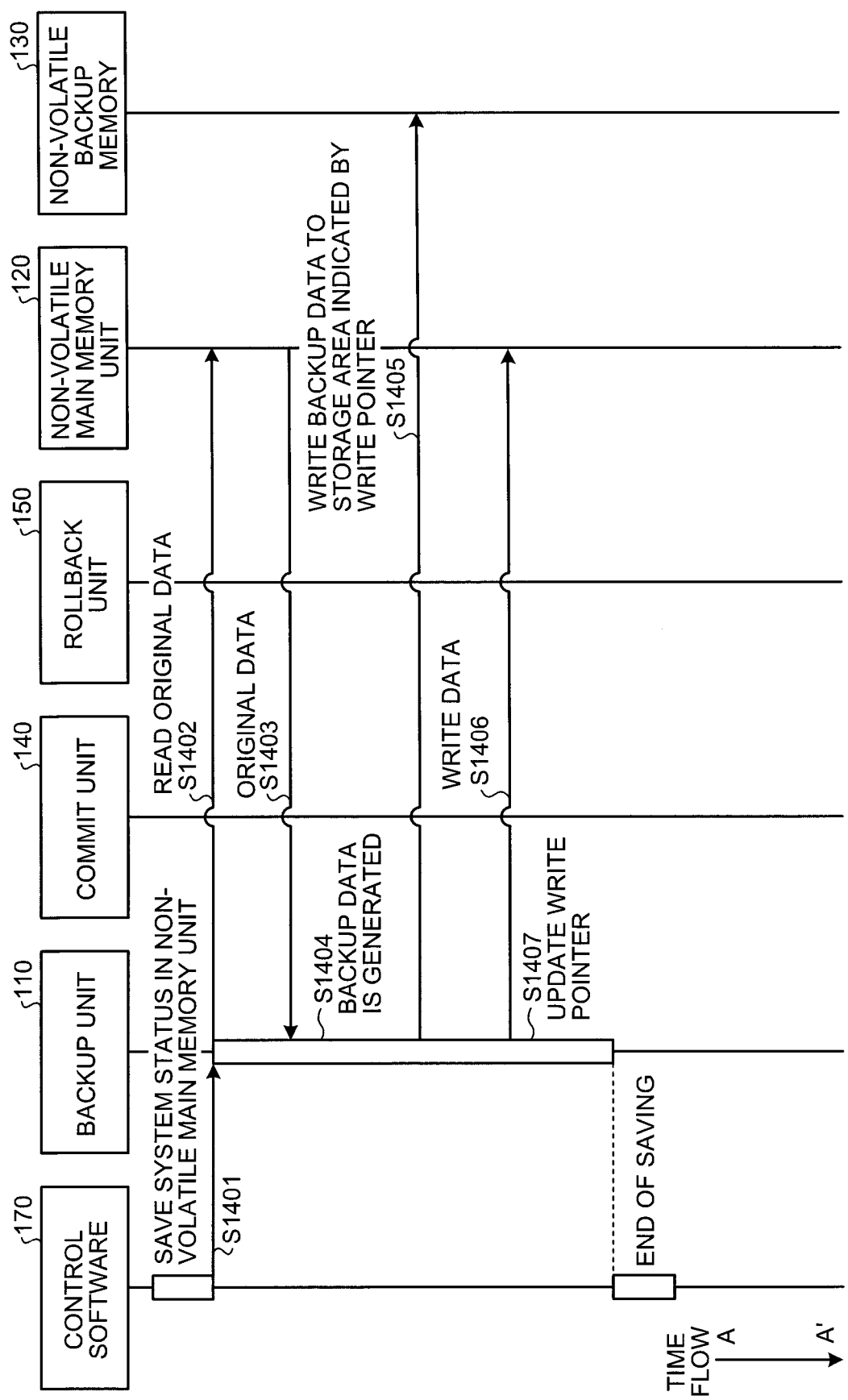

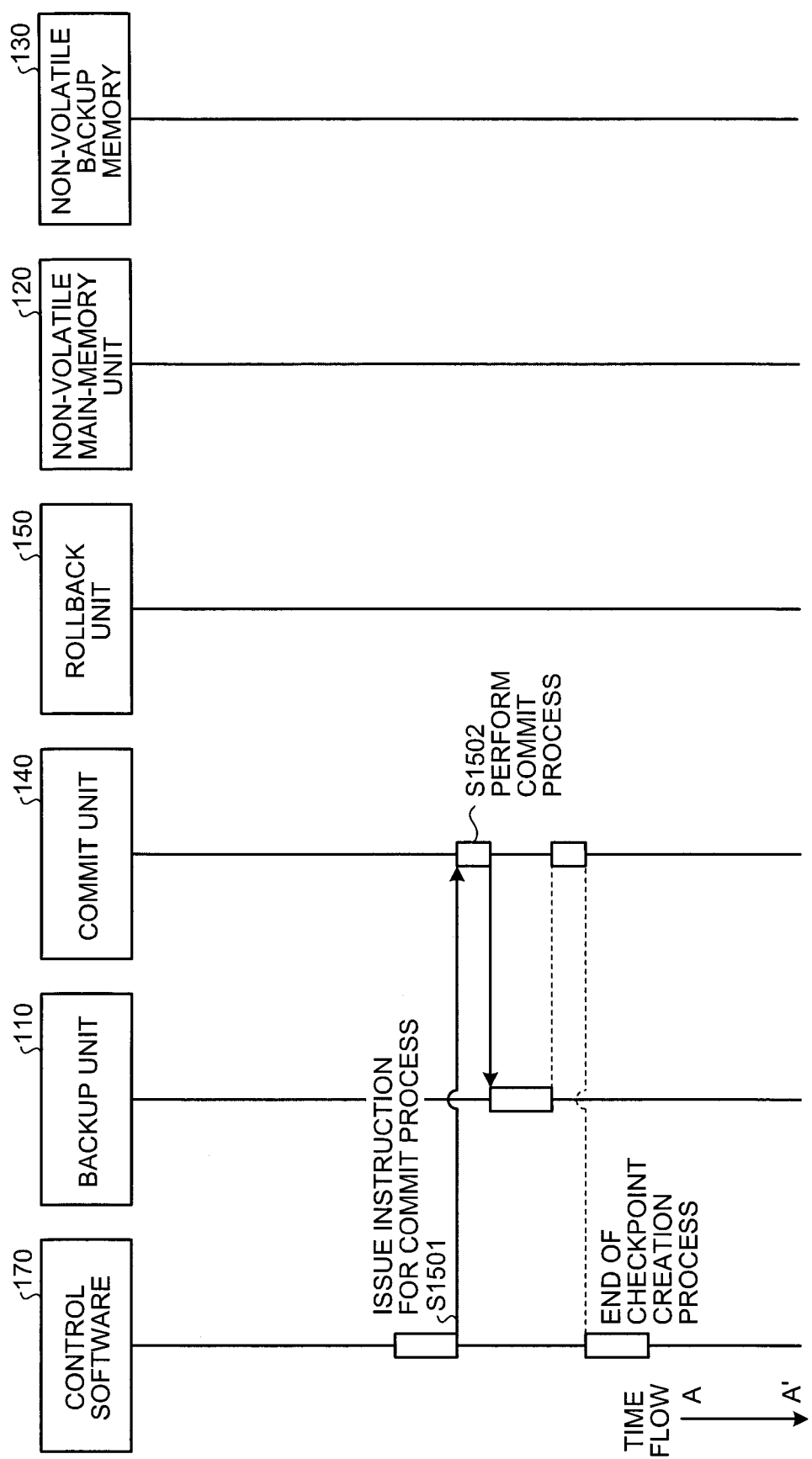

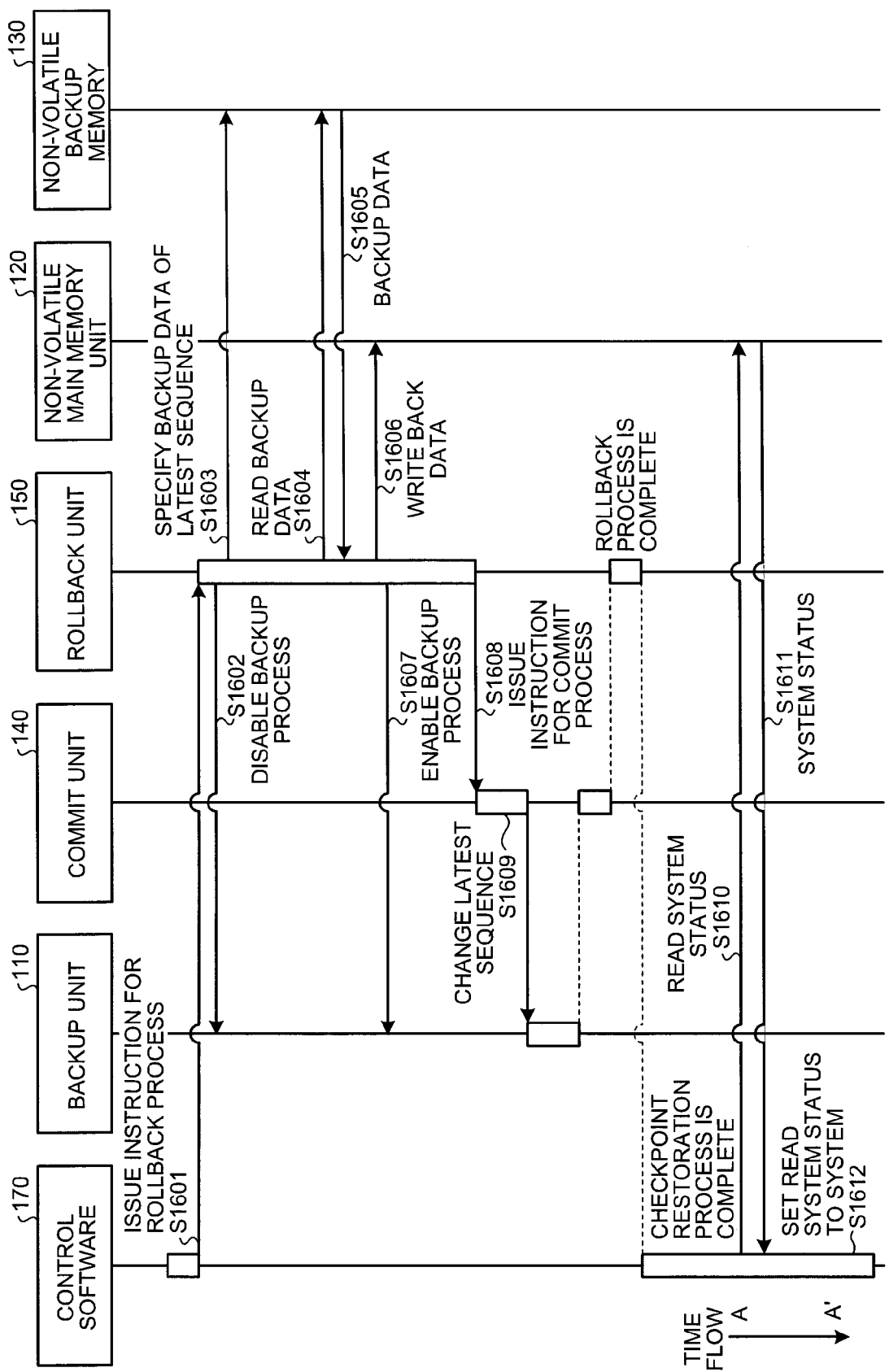

INFORMATION PROCESSING APPARATUS AND DATA RECOVERING METHOD

CROSS-REFERENCE TO RELATED APPLICATIONS

This application is based upon and claims the benefit of priority from the prior Japanese Patent Application No. 2007-336854, filed on Dec. 27, 2007; the entire contents of which are incorporated herein by reference.

BACKGROUND OF THE INVENTION

1. Field of the Invention

The present invention relates to a information processing apparatus that includes a non-volatile main memory unit and a data recovering method.

2. Description of the Related Art

Recently, development of a technology related to non-volatile memories such as a flash memory, a magneto-resistive random access memory (MRAM), a ferroelectric random access memory (FeRAM), and a phase change random access memory (PRAM) is in progress. In the non-volatile memory, recorded data cannot be lost even if a power outage occurs. It is anticipated that in the future, the non-volatile memory will be a substitute for a volatile memory such as a dynamic random access memory (DRAM) that is presently widely used as a main memory in computers.

If such a non-volatile memory is used as the main memory in the computers, data saved in the main memory or a status of a system will not be lost even if the power outage occurs in the main memory during processing of computer programs. The data stored in the main memory or the status of the system will be retained in the main memory. Due to this, when power is restored, computer operations can be easily restarted from a status at the time of the power outage, thus shortening activation time of the computers and enhancing operability. In the non-volatile memory, which differs from the volatile memory, a power supply device is not required for maintaining stored contents. Thus, reduction in power consumption of the entire computer, miniaturization of a battery, and longevity of the battery can be anticipated.

In an existing technology disclosed in JP-A 2005-107573 (KOKAI), when power is restored after sudden power outage in the computer that uses such non-volatile memory, interruption is notified to a central processing unit (CPU) by using a power monitoring mechanism for maintaining and restoring the status at the time of the power outage. The status of the CPU is saved in the main memory unit by using control software that is similar to an operating system.

However, in the technology described in JP-A 2005-107573 (KOKAI), when power is restored after sudden power outage, to restore a volatile system status such as a processor status, it is necessary to secure power when storing the system status in a non-volatile memory (hereinafter, "non-volatile main memory unit") at sudden power outage. For this reason, batteries such as additional capacitors are required. In other words, the batteries are not required for maintaining the system status stored in the non-volatile main memory unit, however, the batteries are required for storing the system status at sudden power outage. Generally, the battery used in the computer for concluding the writing process is a secondary battery. Thus, insufficient power is likely to be supplied if the power outage occurs frequently.

For adequate power supply even at the time of sudden power outage, battery capacity can be increased by using bigger batteries. By using the non-volatile main memory unit, it is anticipated that the batteries that are indispensable for volatile memory can be made compact or eliminated. However, providing bigger batteries to cope up with sudden power outage contradicts the earlier anticipation.

SUMMARY OF THE INVENTION

According to one aspect of the present invention, a information processing apparatus includes a main memory unit that is non-volatile; a backup memory unit that is non-volatile and that stores copies of data stored in the main memory unit; a reading unit that reads the data stored in advance in a storage area in the main memory unit indicated by a write destination address, when a write access is detected, the write access including a write data to be written to the main memory unit and the write destination address indicating a write destination of the write data; a generating unit that generates a backup data that includes the data and the write destination address included in the write access; a first writing unit that writes the backup data to the backup memory unit; a second writing unit that writes the write data to the storage area indicated by the write destination address of the main memory unit, after writing the backup data to the backup memory unit; a commit unit that sets with a read permission, the backup data to be newly written to the backup memory unit from the present time by the first writing unit by setting a readable address which can read the backup data to be newly written to the write address to write the backup data in the backup memory unit;

an extracting unit that extracts the data and the write destination address included in the backup data that is made set with the read permission from the backup data stored in the backup memory unit, when receiving an instruction for writing back storage contents of the main memory unit; and a third writing unit that writes, for each of the data and the write destination address extracted from the backup data, the data to the storage area of the main memory unit indicated by the write destination address.

According to another aspect of the present invention, a data recovering method executed in an information processing apparatus that includes a main memory unit that is non-volatile, and a backup memory unit that is non-volatile and that stores copies of data stored in the main memory unit, the method comprising: reading the data stored in advance in a storage area in the main memory unit indicated by a write destination address, when a write access is detected, the write access including a write data to be written to the main memory unit and the write destination address indicating a write destination of the write data; a generating unit that generates a backup data that includes the data and the write destination address included in the write access; writing the backup data to the backup memory unit; writing the write data to the storage area indicated by the write destination address of the main memory unit, after writing the backup data to the backup memory unit; setting with a read permission, the backup data to be newly stored in the backup memory unit from the present time by setting a readable address which can read the backup data to be newly written to the write address to write the backup data in the backup memory unit; extracting the data and the write destination address included in the backup data that is set with the read permission from the backup data stored in the backup memory unit, when receiving an instruction for writing back storage contents of the main memory unit; and writing, for each of the data and the write destination address extracted from the backup data, the data to the storage area of the main memory unit indicated by the write destination address.

BRIEF DESCRIPTION OF THE DRAWINGS

FIG. 3 is a flowchart of a commit process performed by a commit unit;

FIG. 4 is a flowchart of a rollback process performed by a rollback unit;

FIG. 10 is a flowchart of a commit process according to still another embodiment of the present invention;

FIG. 16 is a sequence diagram of the system-status saving process for each unit;

FIG. 17 is a sequence diagram of the checkpoint creation process for each unit; and FIG. 18 is a sequence diagram of the checkpoint restoration process for each unit.

DETAILED DESCRIPTION OF THE INVENTION

Exemplary embodiments of the information processing apparatus and the data recovering method according to the present invention are explained in detail below with reference to the accompanying drawings. An information processing apparatus according to an embodiment of the present invention is applied to a personal computer (hereinafter, called "PC"). However, the present invention is not to be thus limited. The information processing apparatus can be applied to various apparatuses such as a server apparatus and a gaming machine that include a main memory unit.

The present embodiment is explained with reference to the accompanying drawings. Configuration of the PC according to the embodiment is explained first.

Figure 1:
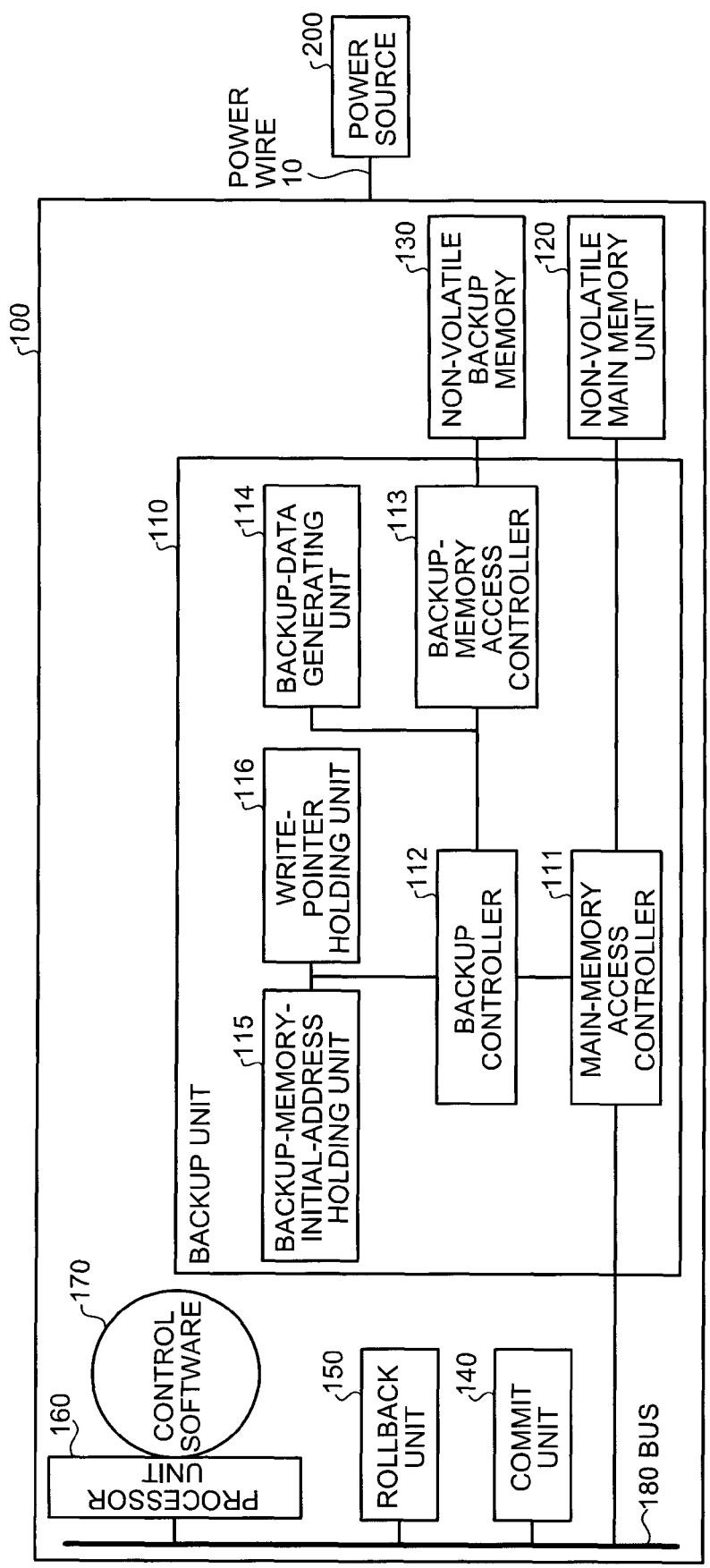
FIG. 1 is a block diagram of a PC according to an embodiment of the present invention.

As shown in FIG. 1, a PC 100 according to the present embodiment includes a backup unit 110, a non-volatile main memory unit 120, a non-volatile backup memory 130, a commit unit 140, a rollback unit 150, a processor unit 160, control software 170, and a bus 180. Power is supplied to the PC 100 from a power source 200 via a power wire 10.

The non-volatile main memory unit 120 is a non-volatile memory such as a magneto-resistive random access memory (MRAM) and a ferroelectric random access memory (Fe-RAM). The non-volatile main memory unit 120 stores therein computer programs of software that is operated in the processor unit 160 or data used by the software. While writing to the non-volatile main memory unit 120, the processor unit 160 transmits a write access to a main-memory access controller 111. Based on the write access received from the processor unit 160, the main-memory access controller 111 carries out writing to the non-volatile main memory unit 120. The write access includes data written to the non-volatile main memory unit 120 by the processor unit 160 and an address (hereinafter, called "write destination address") of the non-volatile main memory unit 120 that specifies a write destination of the data.

Similarly as the non-volatile main memory unit 120, the non-volatile backup memory 130 is the non-volatile memory. A non-volatile backup memory 130 records a backup data that is used to recover data stored in a non-volatile main memory unit 120 at the time of power restoration after sudden power outage. The backup data is the data obtained by duplicating the data already stored in a storage area, which is indicated by a write destination address in a write access, in the non-volatile main memory unit 120, when the write access to the non-volatile main memory unit 120 is detected. Specifically, to enable data recovery in the non-volatile main memory unit 120, the backup data includes at least the write destination address, which is an address of the data updated in the non-volatile main memory unit 120, and a pre-update data (hereinafter, "original data") stored in the address.

A backup unit 110 creates the backup data when carrying out writing to the non-volatile main memory unit 120 and writes the backup data to the non-volatile backup memory 130. Specifically, the backup unit 110 checks an access to the non-volatile main memory unit 120, and when the write access to the non-volatile main memory unit 120 is detected, the backup unit 110 reads from the non-volatile main memory unit 120 the original data already stored in the storage area indicated by the write destination address included in the write access. Further, the backup unit 110 creates the backup data from the original data and the write destination address included in the write access, and stores the backup data in the non-volatile backup memory 130. Subsequently, the backup unit 110 actually writes the data instructed by the write access to the storage area, which is indicated by the write destination address, in the non-volatile main memory unit 120.

The backup unit 110 includes a main-memory access controller 111, a backup controller 112, a backup-memory access controller 113, a backup-data generating unit 114, a backup-memory initial-address holding unit 115, and a write-pointer holding unit 116.

Based on a read/write access, which is received via the bus 180, to the non-volatile main memory unit 120, the main-memory access controller 111 reads the data stored in the non-volatile main memory unit 120 or writes the data to the non-volatile main memory unit 120. However, upon detecting the write access, which is received via the bus 180, to the non-volatile main memory unit 120, instead of immediately writing the data to the non-volatile main memory unit 120, the main-memory access controller 111 temporarily transmits the write destination address to the backup controller 112.

Based on the access to the non-volatile main memory unit 120 from the backup controller 112, the main-memory access controller 111 reads/writes data stored in the non-volatile main memory unit 120. The main-memory access controller 111 transmits to the backup controller 112, the access to the non-volatile backup memory 130 via the bus 180. Furthermore, the main-memory access controller 111 transmits the access to the write-pointer holding unit 116 to the backup controller 112.

For taking backup of data, upon receiving the write access to the non-volatile main memory unit 120 from the main-memory access controller 111, the backup controller 112 reads from the non-volatile main memory unit 120, via the main-memory access controller 111, the data stored in the storage area, of the non-volatile main memory unit 120, indicated by the write destination address. The backup controller 112 transmits the write destination address and the original data read from the non-volatile main memory unit 120 to the backup-data generating unit 114.

The backup controller 112 reads/writes the data stored in the non-volatile backup memory 130 via the backup-memory access controller 113. The backup controller 112 reads and writes a write pointer stored in the write-pointer holding unit 116 and a backup-memory initial address stored in the backup-memory initial-address holding unit 115.

Based on the access from the backup controller 112, the backup-memory access controller 113 reads/writes the data stored in the non-volatile backup memory 130.

The backup-data generating unit 114 generates the backup data from the write destination address and the original data. The write destination address of the non-volatile main memory unit 120 is transmitted from the backup controller 112 and the original data is read from the storage area of the non-volatile main memory unit 120, indicated by the write destination address.

The backup-memory initial-address holding unit 115 maintains an initial address of the non-volatile backup memory 130. In response to a request from the backup controller 112, the backup-memory initial-address holding unit 115 updates contents or transmits the contents to the backup controller 112.

The write-pointer holding unit 116 maintains the write pointer. The write pointer is an address in the non-volatile backup memory 130 in which the backup data is written. In response to the request from the backup controller 112, the write-pointer holding unit 116 updates the contents or transmits the contents to the backup controller 112. The backup unit 110 includes a switch that indicates whether to perform a backup process. The backup unit 110 also includes a function that enables or disables the entire backup process with respect to writing to the non-volatile main memory unit 120. A physical switch or data maintained in a memory can be used as the switch, which indicates whether to perform the backup process upon detecting the write access to the non-volatile main memory unit 120.

The commit unit 140 performs a commit process. The commit process is a series of processes, which creates the status (hereinafter, called "checkpoint"), of the non-volatile main memory unit 120, that is the restoration target, when power is restored after sudden power outage and restoring the status of the non-volatile main memory unit 120 is necessary. Specifically, a commit process is a process in which a commit unit 140 sets with a read permission the backup data, which is newly stored in the non-volatile backup memory 130 by the backup unit 110 since the point the commit process is instructed, as the backup data used when writing back storage contents of the non-volatile main memory unit 120. Details of the commit process depend on data usage (stack, ring buffer etc.) of the non-volatile backup memory 130.

A rollback unit 150 reads from the backup data stored in the non-volatile backup memory 130 the backup data that is set with the read permission and that is required for recovering the contents of the non-volatile main memory unit 120. Further, the rollback unit 150 writes back the original data extracted from the backup data to the storage area indicated by the write destination address, which is extracted from the read backup data, in the non-volatile main memory unit 120. Due to this, a checkpoint status that is created as a latest status of the non-volatile main memory unit 120 is restored.

For the rollback unit 150 to perform a proper restoration process, it is necessary to enable reading of the backup data, which is required for restoring the status of the non-volatile main memory unit 120 to a latest checkpoint status, from a single or a plurality of backup data stored in the non-volatile backup memory 130. In other words, the non-volatile backup memory 130 needs to control the backup data required for restoring the status of the non-volatile main memory unit 120 to the latest checkpoint status. Accordingly, in the commit process, the read permission is set to the backup data, which is newly stored in the non-volatile backup memory 130, from the single or a plurality of backup data controlled prior to the commit process as the single or a plurality of backup data required for a restoration process and controlled by the non-volatile backup memory 130.

A serial backup data stored in and controlled by the non-volatile backup memory 130 since one commit process to a next commit process is called a sequence. The serial backup data stored in the non-volatile backup memory 130 since the last commit process onwards is called a latest sequence. In other words, at a given point of time, the sequence controlled by the non-volatile backup memory 130 is assumed as the latest sequence, and a process of setting the backup data, which is newly stored in the non-volatile backup memory 130, with the read permission as the latest sequence is specifically a latest-sequence changing process.

The processor unit 160 causes the control software 170 to operate. The control software 170 manipulates the data of the non-volatile main memory unit 120 in a normal process and provides system specific functions. The control software 170 issues a request to the commit unit 140 at appropriate timing (for example, at regular time intervals) and creates the checkpoint of the non-volatile main memory unit 120. At the time of power restoration, the control software 170 issues the request to the rollback unit 150 and returns the status of the non-volatile main memory unit 120 till the latest checkpoint.

The commit unit 140, the rollback unit 150, the processor unit 160, and the backup unit 110 are connected by the bus 180. Without connecting directly to the bus 180, the non-volatile main memory unit 120 is connected to the bus 180 via the backup unit 110. Due to this, the non-volatile main memory unit 120 is accessed via the backup unit 110. Thus, in the backup unit 110, the backup process, which is based on the access to the non-volatile main memory unit 120, can be performed. Without restricting the arrangement of the backup unit 110 between the bus 180 and the non-volatile main memory unit 120, the backup unit 110 can be arranged at any position from where the backup unit 110 can receive the access to the non-volatile main memory unit 120 before the non-volatile main memory unit 120 receives the access. In addition to the non-volatile main memory unit 120, the non-volatile backup memory 130 is connected to the backup unit 110.

The backup process performed by the backup unit 110, the commit process performed by the commit unit 140, and the rollback process performed by the rollback unit 150 are explained below with reference to FIG. 2.

The backup unit 110 receives the access from the bus 180 and operates.

First, the main-memory access controller 111 detects the access from the bus 180 (Step S201). The main-memory access controller 111 determines whether the detected access is the read access to the non-volatile main memory unit 120 (Step S202). Specifically, from commands included in the access, the main-memory access controller 111 determines whether the access is the read access. Apart from the read access, the main-memory access controller 111 also determines for another access such as the write access, from the commands included in the access, a type of the access or a storage medium to be accessed.

Upon determining that the detected access is the read access to the non-volatile main memory unit 120 (Yes at Step S202), the main-memory access controller 111 reads the data from the non-volatile main memory unit 120 (Step S203) and returns the read data to the bus 180.

Upon determining that the detected access is not the read access to the non-volatile main memory unit 120 (No at Step S202), the main-memory access controller 111 transmits the access to the backup controller 112 and the backup controller 112 receives the access (Step S204). The backup controller 112 determines whether the received access is the write access to the non-volatile main memory unit 120 (Step S205).

Upon determining that the received access is the write access to the non-volatile main memory unit 120 (Yes at Step S205), the backup controller 112 determines whether the backup process is enabled (Step S206). Upon determining that the backup process is not enabled (No at Step S206), the backup process is not performed and the process proceeds to Step S212. Upon determining that the backup process is enabled (Yes at Step S206), the backup controller 112 transmits a read request to the main-memory access controller 111. The main-memory access controller 111 reads the original data stored in the storage area indicated by the write destination address from the non-volatile main memory unit 120 (Step S207). Next, the backup controller 112 sends the read original data to the backup-data generating unit 114 and the backup-data generating unit 114 generates the backup data from the address and the original data (Step S208).

The backup controller 112 reads from the write-pointer holding unit 116, the address in the non-volatile backup memory 130 in which the generated backup data is written (Step S209). The backup-memory access controller 113 writes the backup data to a storage area in the non-volatile backup memory 130, indicated by the address read by the backup controller 112 (Step S210). The backup controller 112 updates a value of the pointer maintained in the write-pointer holding unit 116 (Step S211). The main-memory access controller 111 writes the data to the write destination address of the non-volatile main memory unit 120 (Step S212).

Upon determining at Step S205 that the received access is not the write access to the non-volatile main memory unit 120 (No at Step S205), the backup controller 112 determines whether the access is the access to the non-volatile backup memory 130 (Step S213). Upon determining that the access is the access to the non-volatile backup memory 130 (Yes at Step S213), the backup-memory access controller 113 reads the data of the non-volatile backup memory 130 or writes the data to the non-volatile backup memory 130 (Step S214).

Upon determining that the access is not the access to the non-volatile backup memory 130 (No at Step S213), the backup controller 112 determines whether the access is the access to the write-pointer holding unit 116 (Step S215). Upon determining that the access is the access to the write-pointer holding unit 116 (Yes at Step 415), the backup controller 112 reads or updates the value of the write-pointer holding unit 116 (Step S216). If it is determined that the write-pointer holding unit 116 is not accessed (No at Step S215), the process ends.

The commit process performed by the commit unit 140 is explained below with reference to FIG. 3. The commit unit 140 is activated according to an instruction for commencing a commit process received by the backup unit 110 from control software 170 and the rollback unit 150 that operate in a processor 160.

The commit unit 140 changes the latest sequence in the non-volatile backup memory 130 (Step S301). Due to the commit process, the status of the non-volatile main memory unit 120 at this point changes to a new checkpoint of the non-volatile main memory unit 120. Details of the commit process depend on a structure of the backup unit 110 and a backup data format.

The rollback process performed by the rollback unit 150 is explained below with reference to FIG. 4. The rollback unit 150 starts by the instructions from the control software 170 that is operated in the processor unit 160.

The rollback unit 150 transmits a request to the backup unit 110 for disabling the backup process (Step S401). The backup unit 110 disables the backup process (Step S402). Due to this, while writing back the backup data to the non-volatile main memory unit 120, the data of the non-volatile main memory unit 120, which is uncertain due to sudden power outage, is not stored as the backup data in the non-volatile backup memory 130.

The rollback unit 150 specifies the latest sequence (Step S403). A latest-sequence specifying method depends on the structure of the backup unit 110 and the backup data format. The rollback unit 150 stores a latest read backup data in the latest sequence in E (Step S404). The rollback unit 150 determines whether E is empty (Step S405).

Upon determining that E is not empty (No at Step S405), the rollback unit 150 transmits the read request to the backup unit 110 (Step S406). The backup unit 110 reads the backup data from the non-volatile backup memory 130 (Step S407) and stores the read backup data in E. The rollback unit 150 transmits to the backup unit 110, a request for writing back the original data to the write destination address included in E (Step S408). The backup unit 110 writes the original data to the indicated address of the non-volatile main memory unit 120 (Step S409). The rollback unit 150 stores in E, the subsequent backup data in the next latest sequence (Step S410). Due to this, backup data can be read in a reverse sequence of the recorded time in the latest sequence, in other words, in a newly stored sequence. Returning to Step S405, the processes from Steps S405 to S410 are repeated for the entire backup data in the latest sequence.

At Step 405, upon determining that E is empty (Yes at Step S405), the rollback unit 150 transmits to the backup unit 110, a request for enabling the backup process (Step S411). The backup unit 110 enables the backup process (Step S412). The rollback unit 150 transmits the commit request to the commit unit 140 (Step S413). The commit unit 140 performs the commit process (Step S414). Due to this, the checkpoint at the time of completion of the rollback process is generated.

The commit unit 140 and the rollback unit 150 can also be configured as software operating in the processor 160. The commit unit 140 and the rollback unit 150 can be arranged inside the backup unit 110 to receive a commit request and a rollback request from the control software 170 via the backup unit 110.

Thus, the non-volatile backup memory 130 is provided, the backup process is performed corresponding to the write access to the non-volatile main memory unit 120, the commit process is performed at an appropriate timing, and the rollback process is performed at the time of subsequent power outage. Due to this, additional power such as batteries need not be used, and even at the time of sudden power outage, the status of the data stored in the non-volatile main memory unit 120 can be restored.

Specifically, because the backup unit 110 is placed between the processor 160 and the non-volatile main memory unit 120 that are connected using a bus 180, the entire original data in the address written to the non-volatile main memory unit 120 after the commit unit 140 performs the commit process is recorded in the non-volatile backup memory 130. Moreover, the data in the non-volatile main memory unit 120 and the backup data in the non-volatile backup memory 130 are stored even after power outage. Due to this, when power is restored after sudden power outage, the rollback unit 150 writes back the backup data stored in the non-volatile backup memory 130 to the non-volatile main memory unit 120 and enables returning to the status of the non-volatile main memory unit 120 prior to a status at the time of the commit process.

The backup unit 110, which generates the backup data in access units of the non-volatile main memory unit 120, is positioned between the bus 180 and the non-volatile main memory unit 120. Due to this, a backup of the contents, which are stored in the non-volatile main memory unit 120 when the processor 160 accesses the memory, can be transparently taken.

Another embodiment according to the present invention is explained below. A concrete structure of the non-volatile backup memory 130 is explained in the present embodiment. Further, in the present embodiment, components differing from the previous embodiment are explained with reference to the accompanying drawings. The remaining components are similar to the components mentioned in the previous embodiment, and therefore the explanation thereof is omitted.

The non-volatile backup memory 130 according to the present embodiment stores the backup data, which is generated by the backup-data generating unit 114, sequentially from the backup-memory initial address in a stack form.

Figure 5A:
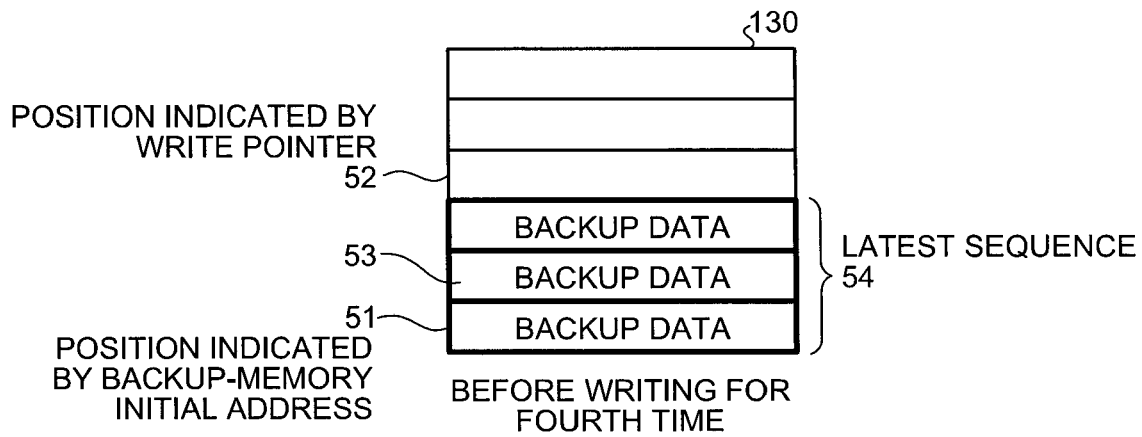
FIG. 5A is a drawing of an example for explaining a status of a non-volatile backup-memory unit at the instance when data is written for a third time to a non-volatile main memory unit since a previous commit process.
Figure 5B:
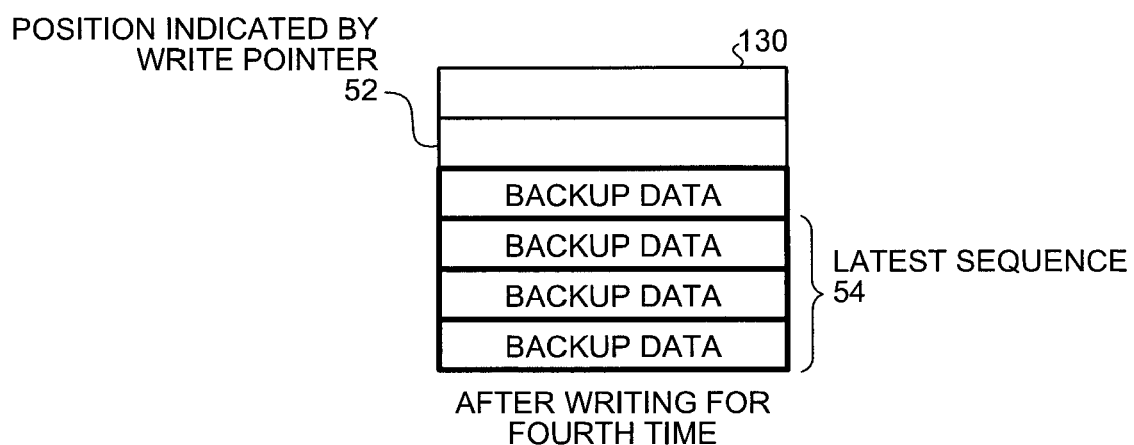
FIG. 5B is a drawing of another example for explaining a status of the non-volatile backup-memory unit at the instance when data is written for a fourth time to the non-volatile main memory unit.
Figure 5C:
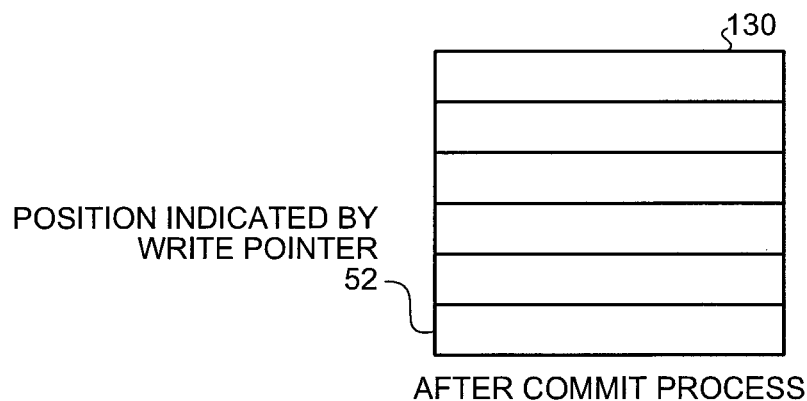
FIG. 5C is a drawing of another example for explaining a status of the non-volatile backup-memory unit after the commit process is performed.

FIGS. 5A to 5C are examples of various statuses of the non-volatile backup memory 130 at the time of commit process. FIG. 5A is a drawing of a status of the non-volatile backup memory 130 at the instance when data is written for a third time to the non-volatile main memory unit 120 since a previous commit process and a set of three backup data 53 is recorded. The set of three backup data 53 is sequentially stored from a position 51 indicated by the backup-memory initial address. A value stored in the write-pointer holding unit 116, that is, a position 52 indicated by the write pointer is an address in which a next backup data is recorded. In other words, the non-volatile backup memory 130 controls a serial backup data 53, which is stored from the position 51 indicated by the backup-memory initial address up to just before the position 52 indicated by the write pointer, as a latest sequence 54. It is possible that the backup data is stored in the address from the position 52 onwards indicated by the write pointer. However, the backup data stored thus is not the latest sequence generated due to the previous commit processes.

FIG. 5B is a drawing of a status of the non-volatile backup memory 130 after data is written for a fourth time to the non-volatile main memory unit 120 and a set of four backup data is recorded. A new backup data is recorded at the position indicated by the write pointer shown in FIG. 5A and thus the position 52 indicated by the write pointer is updated to an address in which a fifth backup data is going to be recorded. Now, as shown in FIG. 5B, the set of backup data including a fourth backup data becomes the latest sequence 54.

FIG. 5C is a drawing of a status of the non-volatile backup memory 130 after the commit process is performed. By performing the commit process, a plurality of backup data to be controlled, that is, the latest sequences are changed. Specifically, the backup-memory initial address is set at the position 52 indicated by the write pointer. Due to this, the set of backup data stored in the non-volatile backup memory 130 since the previous commit process until the current commit process is not treated as the latest sequence and the latest sequence becomes empty.

Size of the backup data according to the present embodiment is taken as the size of the data that the backup-memory access controller 113 can write to the non-volatile backup memory 130 in one writing. For example, if data that is input to the non-volatile backup memory 130 is 64-bit wide, the backup data is configured such that the address is stored in upper 32 bits and the original data is stored in lower 32 bits.

The write-pointer holding unit 116 according to the present embodiment is configured using non-volatile memory. Due to this, a value of the write pointer is maintained by the write-pointer holding unit 116 even after power restoration and the latest sequence in the non-volatile backup memory 130 can be easily specified even after power restoration.

Figure 6:
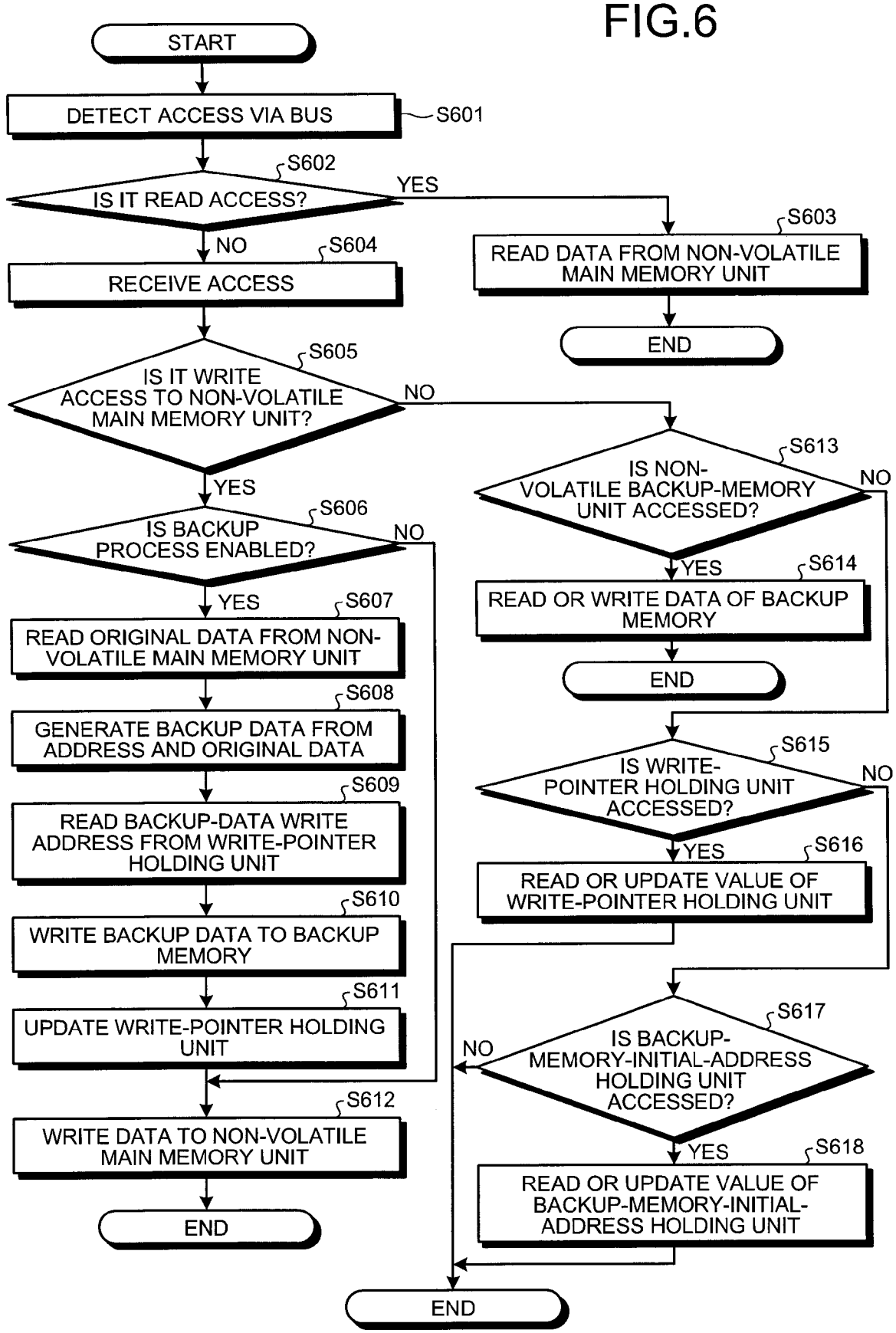
FIG. 6 is a flowchart of a backup process according to another embodiment of the present invention.

FIG. 6 is a flowchart of the backup process performed by the backup unit 110, the commit process performed by the commit unit 140, and the rollback process performed by the rollback unit 150 when the non-volatile backup memory 130 is configured as mentioned earlier.

Figure 2:
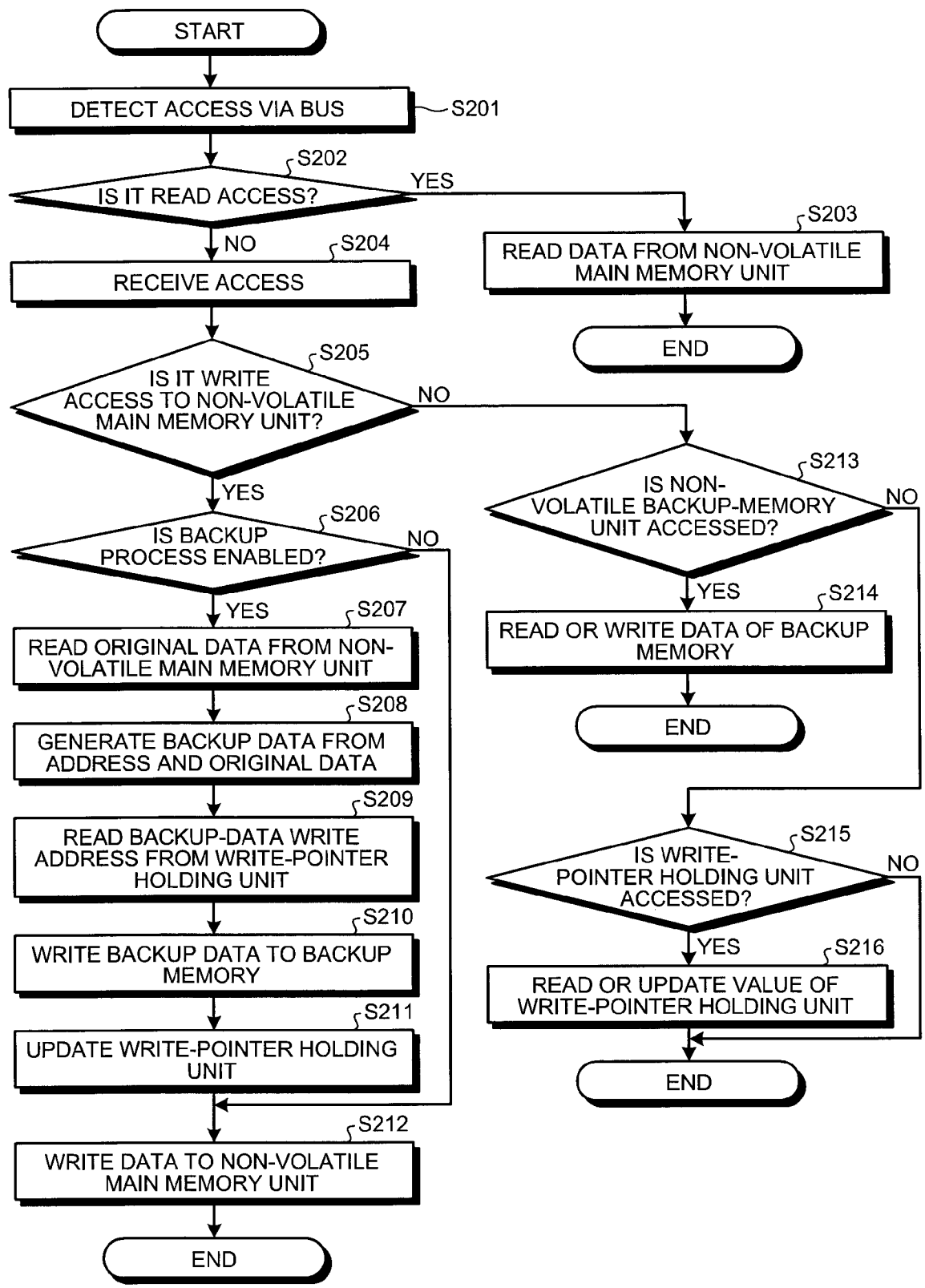
FIG. 2 is a flowchart of a backup process.

A sequence of the backup process according to the present embodiment is almost similar to the flowchart shown in FIG. 2, and therefore only the components that are different are explained further. For explanation of Steps S601 to S616, refer to explanation of Steps S201 to S216 of the flowchart shown in FIG. 2. Explanation of Steps S601 to S616 is omitted here.

At Step S615, if it is determined that the write-pointer holding unit 116 is not accessed (No at Step S615), the backup controller 112 determines if the backup-memory initial-address holding unit 115 is accessed (Step S617). If the backup-memory initial-address holding unit 115 is accessed (Yes at Step S617), the backup controller 112 reads or updates the value of the backup-memory initial-address holding unit 115 (Step S618). If the backup-memory initial-address holding unit 115 is not accessed (No at Step S617), the process ends.

Figure 7:
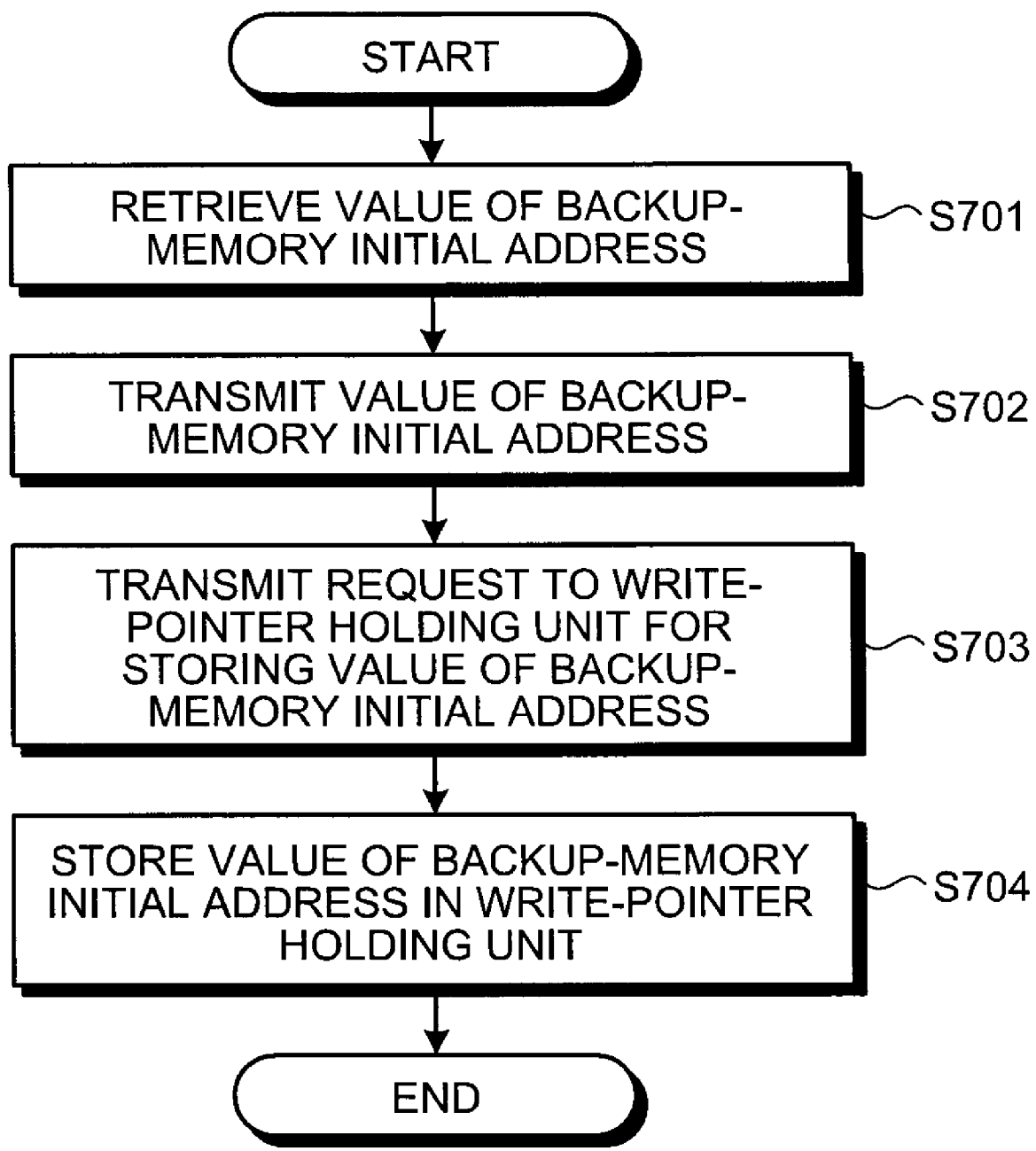
FIG. 7 is a flowchart of a commit process according to another embodiment of the present invention.

The commit process is explained below with reference to FIG. 7.

First of all, the commit unit 140 retrieves the value of the backup-memory initial address from the backup unit 110 (Step S701). In response to a request from the commit unit 140, the backup unit 110 sends the value of the backup-memory initial address maintained by the backup-memory initial-address holding unit 115 (Step S702). The commit unit 140 sends a request to the write-pointer holding unit 116 to store the retrieved value of the backup-memory initial address (Step S703). The backup unit 110 stores the received value of the backup-memory initial address in the write-pointer holding unit 116 (Step S704). For example, when the status of the non-volatile backup memory 130 is as shown in FIG. 5C, the value of the initial address of the non-volatile backup memory 130 is stored in the write-pointer holding unit 116 by performing the commit process.

The rollback process is explained below with reference to FIG. 8. A sequence of the rollback process according to the present embodiment is almost similar to the flowchart shown in FIG. 4, and therefore only the components that are different are explained further. For explanation of Steps S804 to S814, refer to the explanation of Steps S404 to S414 of the flowchart shown in FIG. 4. Explanation of Steps S804 to S814 is omitted here.

First, the rollback unit 150 transmits a request to the backup unit 110 to disable the backup process (Step S801). The backup unit 110 disables the backup process (Step S802). The rollback unit 150 retrieves the values of the write pointer and the backup-memory initial address (Step S803). For example, consider a status as shown in FIG. 5A in which the backup data is stored in the non-volatile backup memory 130. The write-pointer holding unit 116 maintains the write pointer even after power restoration. The rollback unit 150 retrieves the backup-memory initial address and the write pointer from the backup unit 110 and assumes as the latest sequence the serial backup data recorded from the backup-memory initial address up to just before the address indicated by the write pointer. As shown in FIG. 5A, the set of backup data from a first backup data to a third backup data is assumed as the latest sequence. Steps of the rollback process from here onwards are same as the steps shown in FIG. 4, and therefore refer to FIG. 4 for the explanation thereof.

Thus, when the non-volatile backup memory 130 is configured as described above and the commit process is performed, the commit process becomes easier and cost can be reduced. Further, because the commit process becomes easier, although a checkpoint interval is reduced, effect on throughput of an entire personal computer (PC) 100 can be reduced. By reducing the checkpoint interval, a backtracking time during the rollback process can be reduced and an amount of utilization of the non-volatile backup memory 130 can be suppressed.

A concrete structure of the non-volatile backup memory 130 that differs from the structure of the non-volatile backup memory 130 described in the previous embodiment is explained in the present embodiment of the present invention. In the present embodiment, the components that are different from the components described in the previous embodiment are explained with reference to the accompanying drawings. The remaining components are similar to the components mentioned in the previous embodiment, and therefore the explanation thereof is omitted.

In the non-volatile backup memory 130 according to the present embodiment, the backup data generated by the backup-data generating unit 114 is stored in the form of a ring buffer from the backup-memory initial address. Moreover, in the present embodiment, a latest-sequence initial-pointer holding unit (not shown) is provided. The latest-sequence initial-pointer holding unit maintains an initial address of the storage area in the non-volatile backup memory 130 that stores the serial backup data (the latest sequence) used when writing back data to the non-volatile main memory unit 120.

Figure 9A:
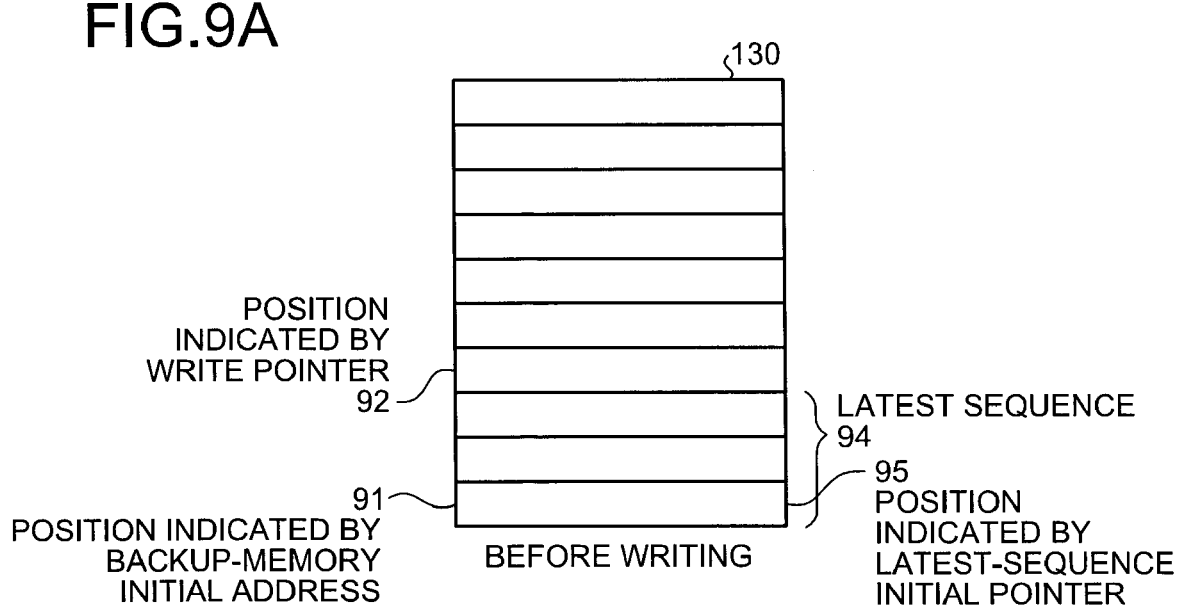
FIG. 9A is a drawing of an example for explaining a status of the non-volatile backup-memory unit at the time of commencing the commit process.

FIGS. 9A to 9E are examples of various statuses of the non-volatile backup memory 130 at the time of commit process according to the present embodiment. As shown in FIG. 9A, in addition to the previous embodiment, the backup data stored from a position 95, which is indicated by a latest-sequence initial pointer maintained by the latest-sequence initial-pointer holding unit, up to just before a position 92, which is indicated by the write pointer, is assumed as the latest sequence in the present embodiment. Further, in the commit process, the latest sequence is changed by setting the contents of the write pointer to the latest-sequence initial pointer and not by setting the contents of the backup-memory initial address (an address of a position 91 indicated by the backup-memory initial address) to the write pointer as mentioned in the previous embodiment.

Figure 9B:
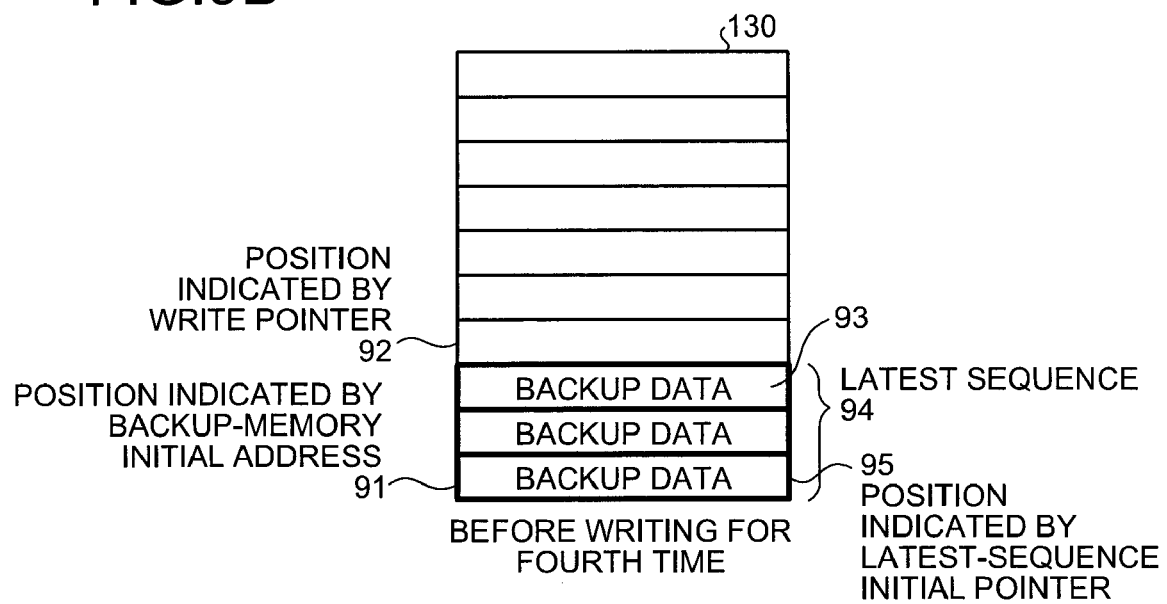
FIG. 9B is a drawing of another example for explaining a status of the non-volatile backup-memory unit at the instance when data is written for a third time to the non-volatile main memory unit.

FIG. 9B is a drawing of a status of the non-volatile backup memory 130 at the instance when data is written for a third time to the non-volatile main memory unit 120 since the status of the non-volatile backup memory 130 shown in FIG. 9A and a set of three backup data is recorded. The set of three backup data is sequentially stored from the position 91 indicated by the backup-memory initial address. The value stored in the write-pointer holding unit 116, in other words, the position 92 indicated by the write pointer is the address in which a next backup data is stored. As shown in FIG. 9B, the set of three backup data stored from the position 95, which is indicated by the latest-sequence initial pointer, up to just before the position 92, which is indicated by the write pointer, is assumed as a latest sequence 94.

Figure 9C:
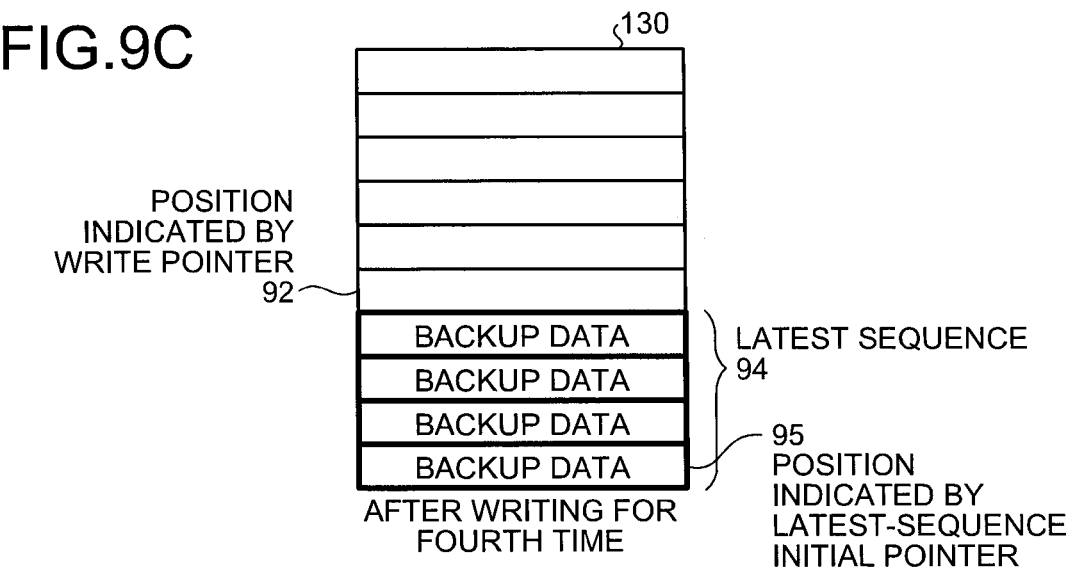
FIG. 9C is a drawing of another example for explaining a status of the non-volatile backup-memory unit at the instance when data is written for a fourth time to the non-volatile main memory unit.

FIG. 9C is a drawing of a status of the non-volatile backup memory 130 after data is written for a fourth time to the non-volatile main memory unit 120 since the status of the non-volatile backup memory 130 shown in FIG. 9B and a fourth backup data is stored. A new backup data is recorded at the position 92 indicated by the write pointer shown in FIG. 9B and thus the position 92 indicated by the write pointer is updated to a position at which a next backup data is stored. In FIG. 9C, a set of four backup data stored from the position 95, which is indicated by the latest-sequence initial pointer, up to just before the position 92, which is indicated by the write pointer, is assumed as the latest sequence 94.

Figure 9D:
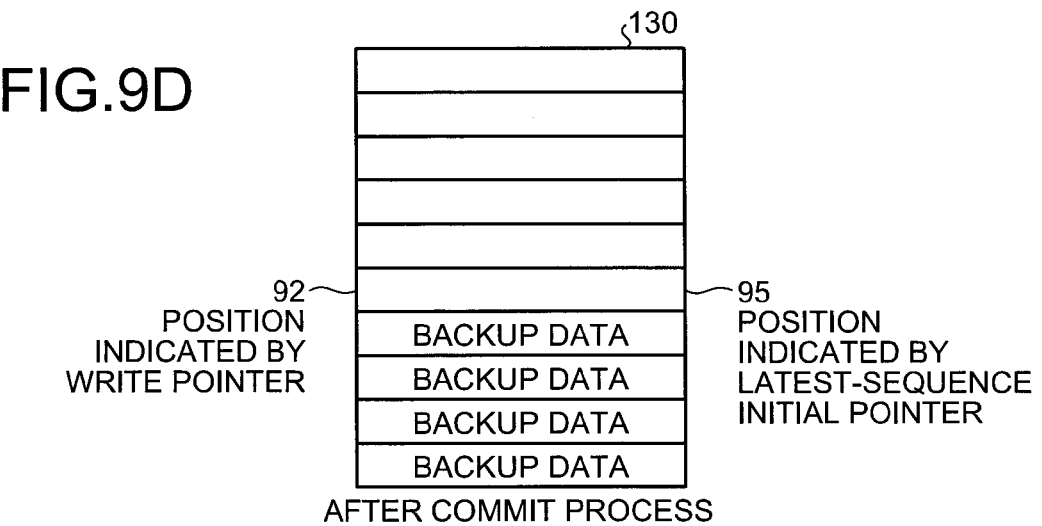
FIG. 9D is a drawing of another example for explaining a status of the non-volatile backup-memory unit after the commit process is performed.

FIG. 9D is a drawing of a status of the non-volatile backup memory 130 when the commit process is performed when the status of the non-volatile backup memory 130 is as shown in FIG. 9C. By performing the commit process, the commit unit 140 sets the contents of the write pointer to the latest-sequence initial pointer (the position 95 indicated by the latest-sequence initial pointer) and thus the position 95 indicted by the latest-sequence initial pointer becomes the same as the position 92 indicated by the write pointer. In other words, the commit unit 140 changes the latest sequence by performing the commit process. Further, the status of the non-volatile main memory unit 120 at the time of the commit process changes to a new checkpoint, and the backup data, which is going to be stored in the non-volatile backup memory 130 from now onwards until a next commit process is performed, serves as the backup data required for restoring the status of the non-volatile main memory unit 120 to a new checkpoint status.

Figure 9E:
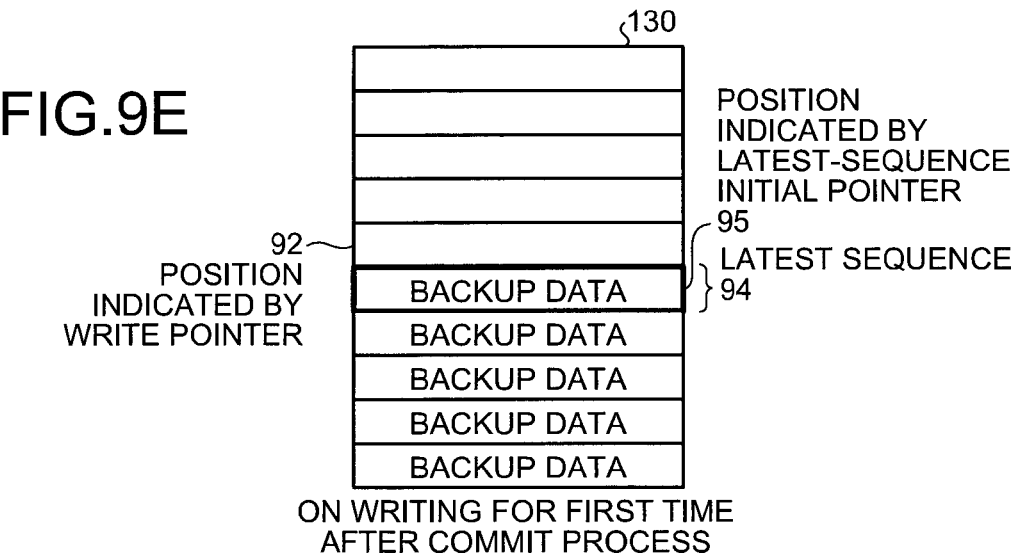
FIG. 9E is a drawing of another example for explaining a status of the non-volatile backup-memory unit at the instance when data is written for a first time to the non-volatile main memory unit after the commit process is performed.

FIG. 9E is a drawing of a status of the non-volatile backup memory 130 when data is written to the non-volatile main memory unit 120 for a first time after performing the commit process and a single backup data is stored. The commit unit 140 stores the backup data at the position 92 indicated by the write pointer shown in FIG. 9D and updates the write pointer, and thus the non-volatile backup memory 130 attains the status shown in FIG. 9E. As shown in FIG. 9E, the backup data stored now becomes the latest sequence 94. The position 95 indicated by the latest-sequence initial pointer shown in FIG. 9E is the same as the position 95 shown in FIG. 9D. So far, usage of the non-volatile backup memory 130 and the commit process were explained.

Next, the commit process is explained with reference to FIG. 10.

First, the commit unit 140 retrieves the value of the write pointer from the backup unit 110 (Step S901). In response to the request from the commit unit 140, the backup unit 110 transmits the value of the write pointer maintained by the write-pointer holding unit 116 (Step S902). The commit unit 140 transmits a request to the latest-sequence initial-pointer holding unit to store the retrieved value of the write pointer (Step S903). The backup unit 110 stores the value of the write pointer to the latest-sequence initial-pointer holding unit (Step S904). Due to the commit process, the position indicated by the write pointer and the position indicated by the latest-sequence initial pointer, which are shown in FIG. 9D, become the same and the latest sequence is changed.

A process flow of the backup process according to the present embodiment is almost the same as the process flow shown in FIG. 6. The only thing that differs is an update process of the write-pointer holding unit performed by using the backup controller (Step S611). In the present embodiment, mere updating is not sufficient, moreover, if the position indicated by the write pointer arrives at a rearmost address of the non-volatile backup memory 130, the value maintained by the backup-memory initial-address holding unit 115 is set to the write-pointer holding unit 116 as the update process.

Figure 8:
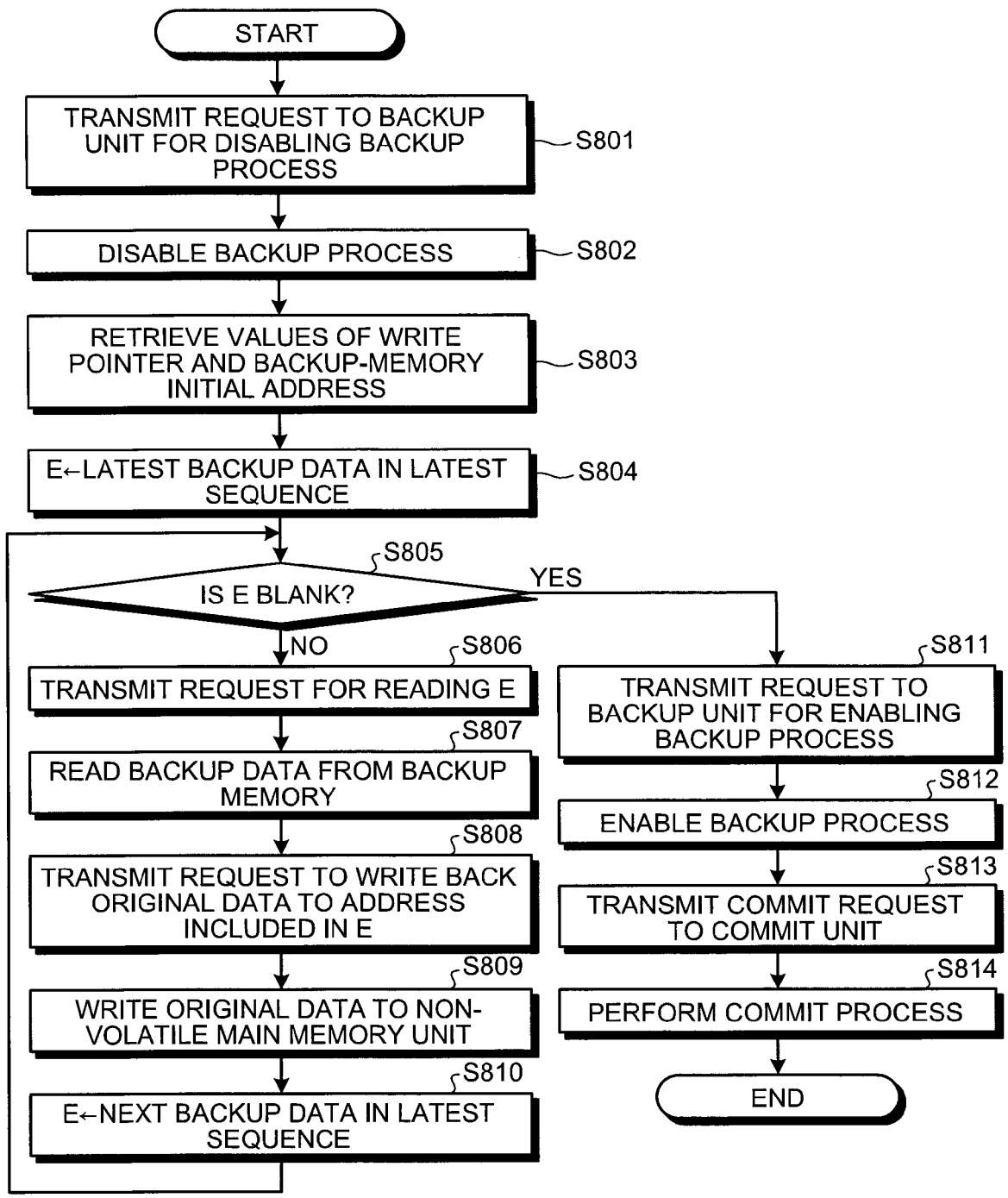
FIG. 8 is a flowchart of a rollback process according to another embodiment of the present invention.

A process flow of the rollback process according to the present embodiment is almost the same as the process flow as shown in FIG. 8. The only thing that differs is a process in which the values of the write pointer and the backup-memory initial address are retrieved by the rollback unit (Step S803). In the present embodiment, the latest sequence necessary for rollback is specified by retrieving the value of the latest-sequence initial pointer and not the value of the backup-memory initial address.

Still another embodiment according to the present invention is explained below with reference to the accompanying drawings. In a PC according to the present embodiment, a volatile system status such as a processor status, which includes a status of a control program and a status of an application program that operate in a processor at the instance when sudden power outage occurs, is restored when power is restored after sudden power outage.

An example of a structure of the PC according to the present embodiment is explained with reference to FIG. 11. In the present embodiment, control software that controls each component differs from the control software described in the previous embodiment, and the present embodiment is explained focusing on a structure and an operation of the control software 170 that operates in the processor 160.

Figure 11:
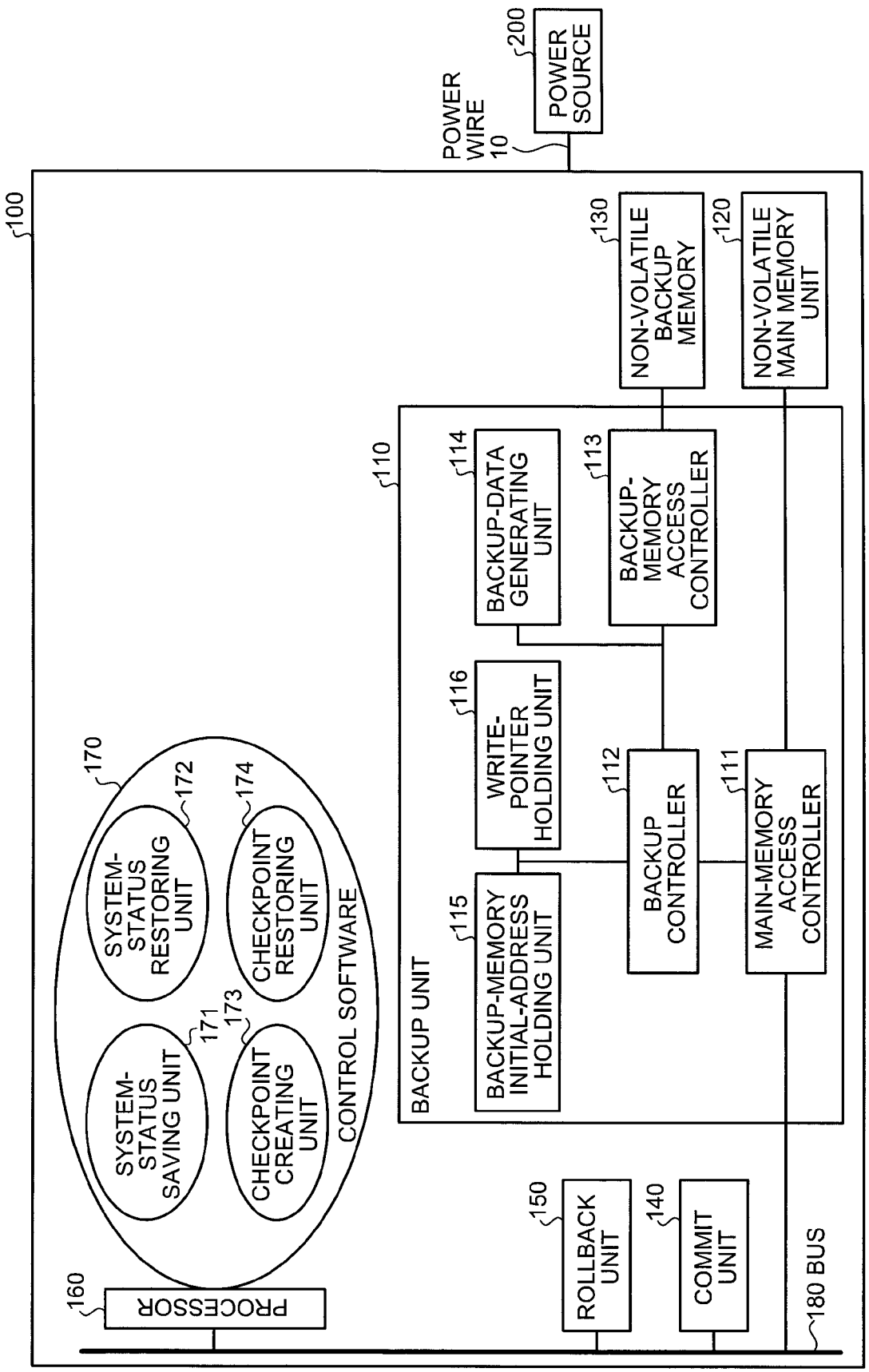
FIG. 11 is a block diagram of a PC according to still another embodiment of the present invention.

As shown in FIG. 11, the PC 100 according to the present embodiment includes the backup unit 110, the non-volatile main memory unit 120, the non-volatile backup memory 130, the commit unit 140, the rollback unit 150, the processor 160, the control software 170, and the bus 180. The structure and functions of the backup unit 110, the non-volatile main memory unit 120, the non-volatile backup memory 130, the commit unit 140, the rollback unit 150, the processor 160, and the bus 180 are the same as that mentioned in the previous embodiment, and therefore the explanation thereof is omitted.

The control software 170 operates in the processor 160 and controls operations of various hardware, particularly of the processor 160. When exercising the control, the control software 170 operates another software in the processor 160. For example, when the control software 170 is a general operating system, the application software operates in the processor 160 under the control of the control software 170. When a plurality of application software are operated in the processor 160, the control software 170 operates by sequentially changing the application software depending on an interruption occurring in a device, a fixed time interruption according to a time period set by the control software 170 itself, etc.

The control software 170 further includes a system-status saving unit 171, a system-status restoring unit 172, a checkpoint creating unit 173, and a checkpoint restoring unit 174.

The system-status saving unit 171 maintains the system status in a dedicated storage area that is already secured in a predetermined timing. In the present embodiment, because the dedicated storage area is secured in the non-volatile main memory unit 120, the system status is assumed as data to be backed up that is explained in the previous embodiments.

The system status refers to data required for continuing the operations of the PC 100, and that includes data for controlling execution of software programs maintained by the processor 160 during execution of the software programs (the control software and the application software) by the processor 160 and data indicating the status of the processor 160 itself. Specifically, the system status is the data for configuring an execution status of the PC 100 at a given time and that includes contents of a general-purpose register that is held by the processor 160 including the data maintained by the software program that was running until just before the power outage. The system status further includes contents of a register, such as addresses indicating a storage location of commands to be executed by the processor 160, controlling the operations of the processor 160. The system status also includes setting of the processor 160 such as a memory controlling unit set by the control software 170. Further, the system status indicates a volatile data among the data required for restoring the status at the time of power outage when power is restored after sudden power outage.

The system-status saving unit 171 maintains the system status when the interruption occurs in the device provided in the PC 100, or when the fixed time interruption occurs according to a time period set by the control software 170 itself, or when application software is changed.

When power is restored after sudden power outage, the system-status restoring unit 172 resets the system status, which is stored in the storage area of the non-volatile main memory unit 120, to the PC 100 and restores the system status. For maintaining consistency with the data to be rolled back that is mentioned in the previous embodiment, the system-status restoring unit 172 operates after the checkpoint restoring unit 174 restores the contents of the non-volatile main memory unit 120.

The checkpoint creating unit 173 issues the commit request to the commit unit 140 and newly creates the status of the non-volatile main memory unit 120 that can be rolled back by the rollback unit 150, in other words, newly creates the checkpoint. After system startup, when the checkpoint is not created even once, the status of the non-volatile main memory unit 120 that can be rolled back by the rollback unit 150 remains as the status that is at the time of system startup.

Because the non-volatile backup memory 130 in which the backup unit 110 writes the backup data is limited, the storage area in the non-volatile backup memory 130 in which the backup data is written is lost if the checkpoint is not created for a long time. Even at that time, rolling back can be carried out only to the status that is at the time of system startup. Therefore, the checkpoint creating unit 173 needs to perform a checkpoint creation process at an appropriate timing.

When it is detected that power supply from a power source 200 is restored, the checkpoint restoring unit 174 transmits to the rollback unit 150 a request to roll back the contents of the non-volatile main memory unit 120 up to the contents of the latest checkpoint. Due to this, when the control software 170 is activated, the checkpoint restoring unit 174 determines whether the control software 170 is reactivated upon power restoration after sudden power outage. However, a determining unit can be mounted in any way.

The system-status saving unit 171, the system-status restoring unit 172, the checkpoint creating unit 173, and the checkpoint restoring unit 174 are provided as software operating in a dedicated processor and can be provided to operate in any dedicated hardware, or as software operating in a usual processor.

Figure 12:
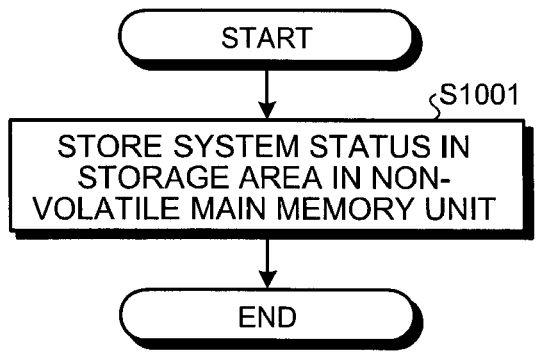
FIG. 12 is a flowchart of a system-status-saving process.

A system status saving process is explained below with reference to FIG. 12.

The system-status saving unit 171 stores the system status in the storage area secured in the non-volatile main memory unit 120 (Step S1001).

Figure 13:
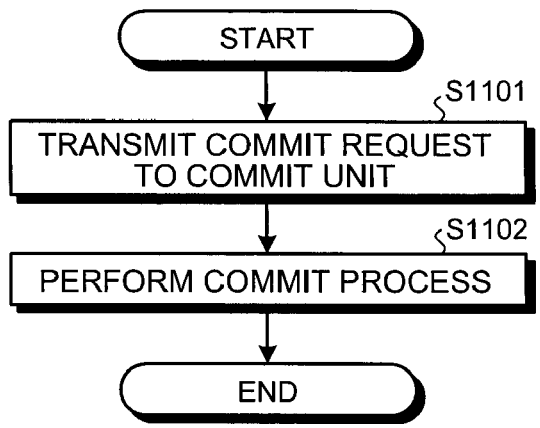
FIG. 13 is a flowchart of a checkpoint creation process.

The checkpoint creation process is explained below with reference to FIG. 13.

The checkpoint creating unit 173 transmits the commit request to the commit unit 140 in response to an instruction for checkpoint creation (Step S1101). The commit unit 140 performs the commit process in response to the commit request (Step S1102). Specifically, by executing the process described in FIG. 3, the checkpoint is created and the latest sequence controlled by the non-volatile backup memory 130 is changed.

Figure 14:
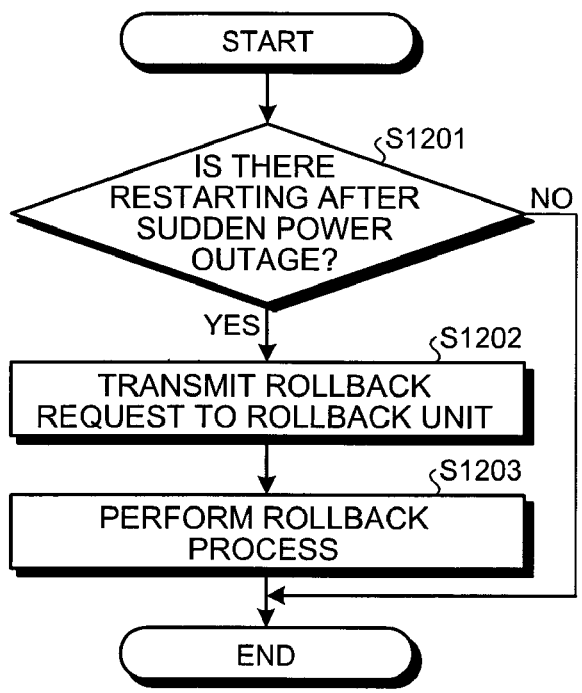
FIG. 14 is a flowchart of a checkpoint restoration process.

A checkpoint restoration process is explained below with reference to FIG. 14. When the PC 100 is turned on and the control software 170 starts operating, the checkpoint restoring unit 174 is initially called.

The checkpoint restoring unit 174 determines whether there is restarting after sudden power outage (Step S1201) and based on this, checks whether rollback is necessary. The PC 100 can use either a physical function or a logical function if the function can determine whether there is restarting after sudden power outage.

If it is determined that there is no restarting after sudden power outage (No at Step S1201), the process ends. If it is determined that there is restarting after sudden power outage (Yes at Step S1201), the checkpoint restoring unit 174 transmits the rollback request to the rollback unit 150 (Step S1202) and the rollback unit 150 performs the rollback process (Step S1203). Specifically, the rollback process is performed according to the flowchart shown in FIG. 4 and the contents of the non-volatile main memory unit 120 are restored to the checkpoint status.

Figure 15:
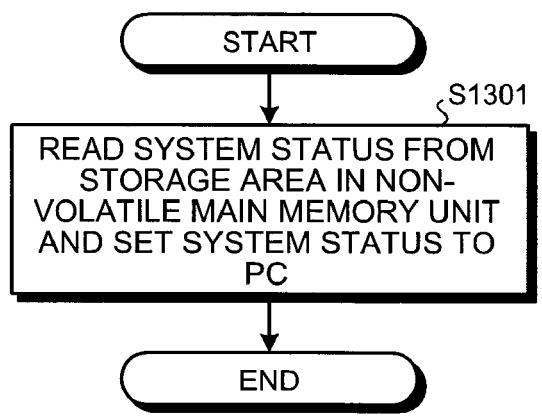
FIG. 15 is a flowchart of a system-status restoration process.

A system-status restoration process is explained below with reference to FIG. 15. The system-status restoration process is always called after the process performed by the checkpoint restoring unit 174.

The system-status restoring unit 172 reads the system status from the storage area of the system status, which is maintained by the non-volatile main memory unit 120 and restored by the process performed by the checkpoint restoring unit 174, and sets the system status to the PC 100 (Step S1301).

The system-status saving process, the checkpoint creation process, the checkpoint restoration process, and the system-status restoration process that take place in the PC 100 are explained below with reference to FIG. 16. As shown in FIG. 16, the processes performed by each unit are indicated in a vertical direction. Arrows connecting each unit indicate controls via signal lines connecting each unit and an exchange of data signals. Passage of time is indicated in a direction A to A'.

First, the system-status saving unit 171 that operates in the processor 160 saves the system status in the storage area in the non-volatile main memory unit 120 (Step S1401). In other words, the system-status saving process is a writing process to the non-volatile main memory unit 120 and therefore the backup unit 110 performs the backup process. The system status is formed of a plurality of data. Therefore, every time when an instruction is issued for writing data to the non-volatile main memory unit 120 for saving the data that forms the system status, the system-status saving unit 171 performs the process shown in FIG. 2.

The backup unit 110 reads the original data stored in the storage area indicated by the address of the non-volatile main memory unit 120 in which the system-status saving unit 171 is going to write the data (Steps S1402, S1403). The backup unit 110 generates the backup data from the read data and the write destination address (Step S1404). The backup unit 110 writes the backup data to the storage area in the non-volatile backup memory 130 indicated by the write pointer maintained by the write-pointer holding unit 116 (Step S1405). The backup unit 110 writes the data included in the write access to the non-volatile main memory unit 120 (Step S1406). In other words, upon writing the backup data to the non-volatile backup memory 130, data is written to the non-volatile main memory unit 120 according to the instruction received from the system-status saving unit 171. The backup unit 110 updates the write pointer of the non-volatile backup memory 130 (Step S1407).

The checkpoint creation process is explained below with reference to FIG. 17.

The checkpoint creating unit 173 operating in the processor 160 issues an instruction to the commit unit 140 to perform the commit process (Step S1501). In other words, the checkpoint creating unit 173 issues an instruction for checkpoint creation. The commit unit 140 performs the commit process (Step S1502). Specifically, the process shown in FIG. 3 is performed and the latest sequence controlled by the non-volatile backup memory 130 is changed. For example, by performing the commit process, the non-volatile backup memory 130 attains the status as shown in FIG. 5C or FIG. 9D. Due to this, the status of the non-volatile main memory unit 120 at this point becomes the new checkpoint of the non-volatile main memory unit 120.

The checkpoint restoration process is explained below with reference to FIG. 18. FIG. 18 is in the form of a sequence diagram in continuation with the system-status restoration process because originally the checkpoint restoration process and the system-status restoration process are performed back to back.

First, the checkpoint restoring unit 174 operating in the processor 160 issues an instruction to the rollback unit 150 to perform rollback process (Step S1601). The rollback unit 150 disables the backup process of the backup unit 110 (Step S1602). The rollback unit 150 specifies the backup data of the latest sequence from the non-volatile backup memory 130 (Step S1603). The rollback unit 150 reads the backup data of the latest sequence from the non-volatile backup memory 130

(Steps S1604 and S1605). The rollback unit 150 writes back the original data to the non-volatile main memory unit 120 by using the backup data of the latest sequence (Step S1606). Specifically, the rollback unit 150 extracts the write destination address of the non-volatile main memory unit 120 and the original data included in the backup data, and writes back to the storage area indicated by the extracted write destination address the original data extracted along with the write destination address.

The rollback unit 150 enables the backup process of the backup unit 110 (Step S1607). Because the backup data used in the rollback process is of no more use, at the end, the rollback unit 150 issues an instruction to the commit unit 140 to commit (Step S1608). The commit unit 140 changes the latest sequence controlled by the non-volatile backup memory 130 (Step S1609). Upon performing all such processes, the rollback process is accomplished and thus the checkpoint restoration process is accomplished.

Subsequently, the system-status restoring unit 172 operating in the processor 160 reads the system status maintained by the non-volatile main memory unit 120 (Steps S1610, S1611) and sets the read system status to the system (Step S1612).

Thus, even for a volatile system status that includes the status of the processor 160, a backup of the volatile system status is maintained by the non-volatile backup memory 130, the commit process is performed at an appropriate timing, and the rollback process is performed at the time of power restoration after sudden power outage. Thus, even if sudden power outage occurs, consistency of the system status can be maintained by using software when power is restored and the PC 100 can be restarted.

In other words, by making small variations in the control software 170 that operates in the processor 160 according to the embodiments mentioned earlier, even if power is restored after sudden power outage, rolling back can be carried out to a specific status that was before power outage, up to the volatile system status that includes the processor status.

Further, in the backup process performed by using existing control software, it is necessary to guarantee that data included in the control software itself can be properly restored. On the other hand, in the embodiments according to the present invention, it can be guaranteed that the system status is properly restored by using the functions of the backup unit 110 alone without using the control software.

The present invention in its broader aspects is not limited to the specific details and representative embodiments shown and described herein. Accordingly, various modifications in the constituent elements may be made without departing from the spirit or scope of the general inventive concept as defined by the appended claims and their equivalents. Various embodiments can be formed by combining a plurality of constituent elements disclosed in the embodiment according to the present invention. For example, some constituent elements can be deleted from the constituent elements indicated in the present embodiment. Furthermore, the constituent elements in different embodiments can be arbitrarily combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
a main memory unit that is non-volatile;
a backup memory unit that is non-volatile and that stores copies of data stored in the main memory unit;
a reading unit that reads the data stored in advance in a storage area in the main memory unit indicated by a write destination address, when a write access is detected, the write access including a write data to be written to the main memory unit and the write destination address indicating a write destination of the write data;
a generating unit that generates a backup data that includes the data and the write destination address included in the write access;
a first writing unit that writes the backup data to the backup memory-unit;
a second writing unit that writes the write data to the storage area indicated by the write destination address of the main memory unit, after writing the backup data to the backup memory unit;
a commit unit that sets with a read permission, the backup data to be newly written to the backup memory unit from the present time by the first writing unit by setting a read address to read the backup data to be newly written to the write address to write the backup data in the backup memory unit;
an extracting unit that extracts the data and the write destination address included in the backup data that is made set with the read permission from the backup data stored in the backup memory unit, when receiving an instruction for writing back storage contents of the main memory unit; and
a third writing unit that writes, for each of the data and the write destination address extracted from the backup data, the data to the storage area of the main memory unit indicated by the write destination address.

2. The apparatus according to claim 1, wherein
the commit unit sets an initial address of the backup memory unit as the read address to the write address to write the backup data in the backup memory unit, and
the extracting unit extracts the data and the write destination address included in the backup data stored from the initial address of the backup memory unit up to an address just before a position where the backup data is written next time.

3. The apparatus according to claim 1, further comprising:
an initial-address holding unit that stores an initial backup data address in the backup memory unit that stores the initial backup data, and that is used at the time of writing back the storage contents of the main memory unit, wherein
the commit unit sets the initial backup data address in the initial-address holding unit as the read address to the write address to write the backup data in the backup memory unit at next time, and
the extracting unit extracts the data and the write destination address included in the backup data stored from the initial backup data address that is stored in the initial-address holding unit up to an address just before a position where the backup data is written.

4. The apparatus according to claim 1, further comprising:
a status-information saving unit that transmits the write access that treats as the write data status information that controls execution of software programs maintained by a processor during execution of the software programs by the processor, and treats a predetermined address in the main memory unit as the write destination address;
a checkpoint creating unit that issues an instruction to run the commit unit at a predetermined timing;

a checkpoint restoring unit that issues an instruction to run the third writing unit when restoring a power; and a status-information restoring unit that writes back the status information restored by the third writing unit according to the instruction issued by the checkpoint restoring unit.

5. The apparatus according to claim 4, wherein the status information includes data that controls the execution of the software programs and that is stored in a register included in the processor.

6. The apparatus according to claim 5, wherein the status information includes addresses indicating the storage area of commands that are subsequently executed by the processor.

7. The apparatus according to claim 5, wherein the status information includes data temporarily stored during execution of the software programs by the processor.

8. The apparatus according to claim 4, wherein the second writing unit is connected between the processor and the main memory unit, receives the write access from the processor, and transmits the received write access to the main memory unit.

9. The apparatus according to claim 1, further comprising:
a processor; and
a memory unit that stores a first software program,
wherein the first software program causes the processor to function as,
a status-information saving unit that transmits the write access that treats as the write data status information that controls execution of a second software program maintained by the processor during execution of the second software program by the processor, and treats a predetermined address in the main memory as the write destination address,
a checkpoint creating unit that issues an instruction to run the commit unit at a predetermined timing,
a checkpoint restoring unit that issues an instruction to run the third writing unit when restoring a power, and
a status-information restoring unit that writes back the status information restored by the third writing unit according to the instruction issued by the checkpoint restoring unit.

10. A data recovering method executed in an information processing apparatus that includes a main memory unit that is non-volatile, and a backup memory unit that is non-volatile and that stores copies of data stored in the main memory unit, the method comprising:
reading the data stored in advance in a storage area in the main memory unit indicated by a write destination address, when a write access is detected, the write access including a write data to be written to the main memory unit and the write destination address indicating a write destination of the write data;
a generating unit that generates a backup data that includes the data and the write destination address included in the write access;
writing the backup data to the backup memory unit;
writing the write data to the storage area indicated by the write destination address of the main memory unit, after writing the backup data to the backup memory unit;
setting with a read permission, the backup data to be newly stored in the backup memory unit from the present time by setting a read address to read the backup data to be newly written to the write address to write the backup data in the backup memory unit;
extracting the data and the write destination address included in the backup data that is set with the read permission from the backup data stored in the backup memory unit, when receiving an instruction for writing back storage contents of the main memory unit; and
writing, for each of the data and the write destination address extracted from the backup data, the data to the storage area of the main memory unit indicated by the write destination address.

* * * * *